(12) United States Patent
Mounioloux

(10) Patent No.: US 12,399,541 B1
(45) Date of Patent: Aug. 26, 2025

(54) SLEEVED STACKED COMPUTER HARDWARE CHASSIS

(71) Applicant: Rouchon Industries, Inc., Anaheim, CA (US)

(72) Inventor: Stephen Mounioloux, Anaheim, CA (US)

(73) Assignee: Rouchon Industries, Inc., Anaheim, CA (US)

( * ) Notice: Subject to any disclaimer, the term of this patent is extended or adjusted under 35 U.S.C. 154(b) by 0 days.

(21) Appl. No.: 18/639,790

(22) Filed: Apr. 18, 2024

(51) Int. Cl.
*G06F 1/18* (2006.01)
*G06F 1/20* (2006.01)

(52) U.S. Cl.
CPC .............. *G06F 1/183* (2013.01); *G06F 1/181* (2013.01); *G06F 1/20* (2013.01)

(58) Field of Classification Search
CPC ...................................................... H05K 7/00
See application file for complete search history.

(56) References Cited

U.S. PATENT DOCUMENTS

| 4,926,291 | A | * | 5/1990 | Sarraf | ................ G11B 33/1493 361/728 |
| 5,555,158 | A | | 9/1996 | Dent | |
| 8,687,350 | B2 | | 4/2014 | Santos | |
| 10,645,832 | B1 | * | 5/2020 | Degner | .................... H05K 5/03 |

* cited by examiner

*Primary Examiner* — Jerry Wu
(74) *Attorney, Agent, or Firm* — Holland & Knight LLP; Matthew C. Cox

(57) ABSTRACT

The present disclosure provides for a computing device. The device may include a chassis, a first component, and a second component. The chassis may include a sleeve, a removable panel detachably secured over an opening formed by the sleeve, a first tray extending from the removable panel into an interior of the sleeve, and a second tray extending from the removable panel into the interior of the sleeve. The first component may include a motherboard and be disposed on the first tray. The second component may include a power supply and be disposed on the second tray. The first tray may be oriented in parallel relative to the second tray. The first tray and the second tray may be vertically oriented.

17 Claims, 29 Drawing Sheets

SLEEVED STACKED COMPUTER HARDWARE CHASSIS

CROSS-REFERENCES TO RELATED APPLICATIONS

Not applicable.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND

The present disclosure relates generally to computing devices. More particularly, the present disclosure relates to a chassis for computing devices or, in other words, mechanical structures implemented to arrange mechanical and/or electrical components of computing devices relative to one another.

A personal computer is a stand-alone desktop computing device housed in a chassis. Such computing devices typically include a motherboard and central processing unit ("CPU") positioned thereon, along with other circuitry and electrical components, such as a graphics processing unit ("GPU") connected thereto. Such personal computers are typically provided with a chassis. Conventional chassis present numerous issues associated with maintenance, repair, and replacement of the various internal components of computing devices. For instance, in order to repair or replace a particular component of a computing device, a panel must be removed from the chassis, and in a manner that may be akin to maintenance on a particular component of a car engine, various intervening components must be dislodged or removed in order for a user to reach the component of concern.

It would be advantageous to provide a computer chassis that allows for expedited maintenance, repair, and/or replacement of individual components of the computing device. What is needed, then, are improvements in apparatuses and methods for chassis of computing devices.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is a computing device. The device may include a chassis, a first component, and a second component. The chassis may include a sleeve, a removable panel detachably secured over an opening formed by the sleeve, a first tray extending from the removable panel into an interior of the sleeve, and a second tray extending from the removable panel into the interior of the sleeve. The first component may include a motherboard and be disposed on the first tray. The second component may include a power supply and be disposed on the second tray. The first tray may be oriented in parallel relative to the second tray. The first tray and the second tray may be vertically oriented. In some embodiments, the first tray is an acrylic mono-block.

In some embodiments, the sleeve includes a vertical panel oriented parallel relative to the removable panel. The sleeve may further include a top panel, a bottom panel oriented parallel to the top panel, a left panel, and a right panel oriented parallel to the left panel, each extending between the vertical panel and the removable panel.

In some embodiments, the first component further includes an add-on card positioned vertically above the motherboard. Additionally, the first and second component may be in electrical connection via a blind mate interface connector such as a Milli-Grid Blind Mate Interface ("BMI") connector, or other suitable blind mate connectors. Furthermore, the second component may include a coolant supply. The coolant supply may be configured to transmit coolant between the first component and the second component via a quick-disconnect fitting.

Another aspect of the present disclosure is chassis for a computing device. The chassis may include a sleeve, a removable panel detachably secured over an opening formed by the sleeve, a first tray extending from the removable panel into an interior of the sleeve, and a second tray extending from the removable panel into the interior of the sleeve. The first tray may be vertically oriented, the second tray may be vertically oriented, and the first tray may be oriented in parallel relative to the second tray.

In some embodiments, the first tray is configured to secure a first component of a computing device, and the second tray is configured to secure a second component of a computing device. The first component may include a motherboard, and the second component may include a power supply.

In some embodiments, the sleeve includes a vertical panel oriented parallel relative to the removable panel. The sleeve may further include a top panel, a bottom panel oriented parallel to the top panel, a left panel, and a right panel oriented parallel to the left panel, each extending between the vertical panel and the removable panel.

In some embodiments, the first component further includes an add-on card positioned vertically above the motherboard. Additionally, the chassis may further include a BMI connector extending between the first tray and the second tray. The BMI connector may be configured to provide electrical communication between the first component and the second component. Furthermore, the second component may include a coolant supply. The chassis may further include a quick-disconnect fitting extending between the first tray and the second tray, such that the coolant supply may be configured to transmit coolant between the first component and the second component via the quick-disconnect fitting.

Another aspect of the present disclosure is a method of providing a computing device. The method may include providing a sleeve, providing a first component, and providing a second component. The first component may include a motherboard, and the second component may include a power supply. The method may further include securing the first component to a first tray, and securing the second component to a second tray. The method may further include fixing the first tray and the second tray to a removable panel. The method may further include detachably securing the removable panel over an opening formed by the sleeve, such that the first tray and the second tray are inserted within an interior of the sleeve.

In some embodiments, the sleeve includes a vertical panel oriented parallel relative to the removable panel. The sleeve may further include a top panel, a bottom panel oriented parallel to the top panel, a left panel, and a right panel oriented parallel to the left panel, each extending between the vertical panel and the removable panel.

In some embodiments, the method further includes orienting the first tray in parallel relative to the second tray. For example, the first tray and the second tray may each be vertically oriented.

In some embodiments, the method further includes providing a BMI connector between the first component and the second component, such that the first component and the second component are in electrical communication via the BMI connector. In further embodiments, the second component includes a coolant supply. The method may further include providing a quick-disconnect fitting between the first component and the second component, such that the coolant supply is configured to transmit coolant between the first component and the second component via the quick-disconnect fitting.

Numerous other objects, advantages and features of the present disclosure will be readily apparent to those of skill in the art upon a review of the following drawings and description of a preferred embodiment.

DETAILED DESCRIPTION

Figure 1:
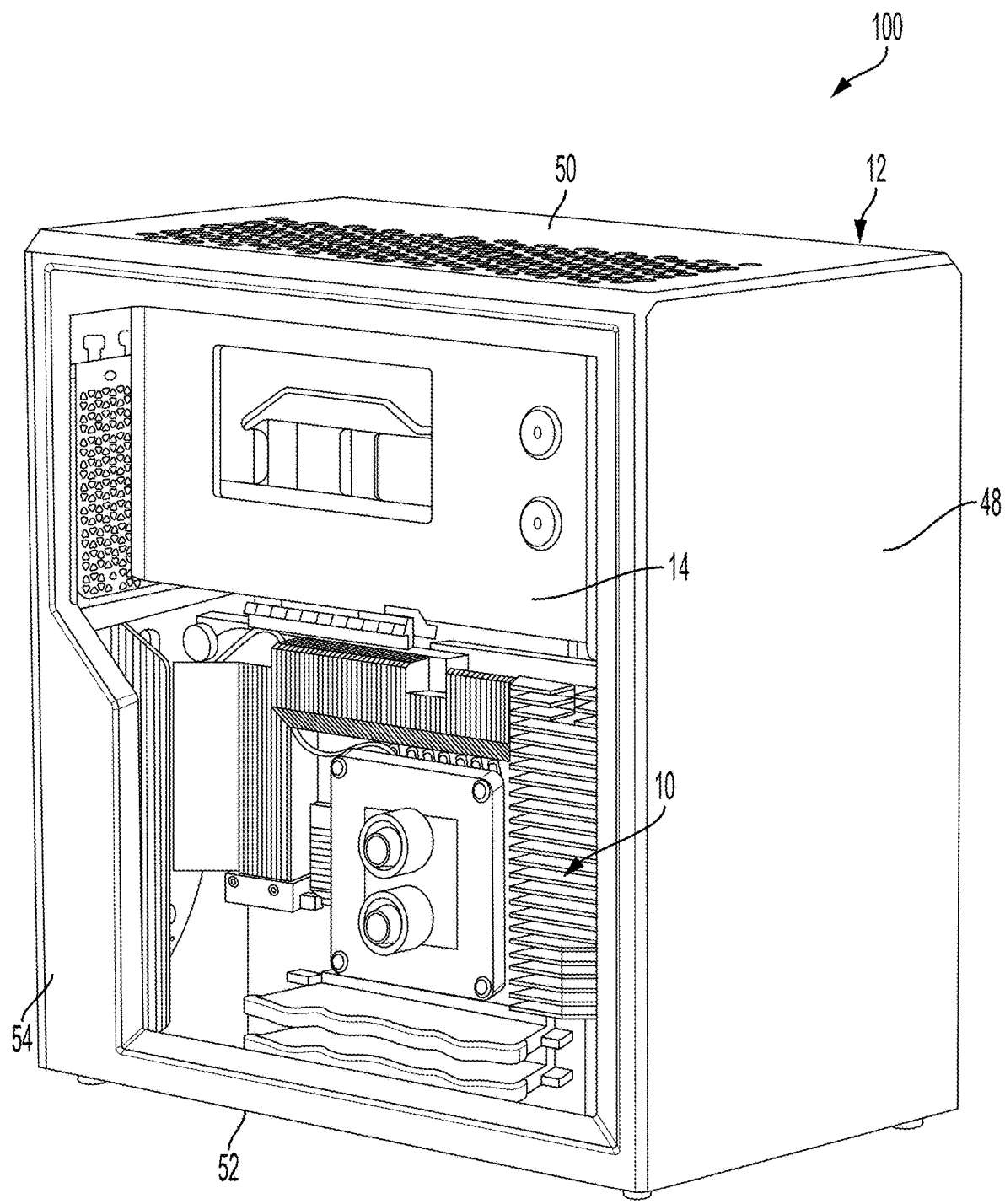
FIG. 1 is a front perspective view of a computing device, according to some embodiments of the present disclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing, or as otherwise described. A person of skill in the art will recognize that the apparatus can assume different orientations when in use.

Referring now to FIGS. 1-7, a computing device ("device") 100 is shown, according to some embodiments of the present disclosure. As discussed in greater detail below, the device 100 may include a chassis 12 that is configured to house the various internal components of the device 100. As provided for herein, such internal components may be internally organized in a first component 47 (e.g., a motherboard component, a component including a motherboard and associated electronics) and a second component 45 (e.g., a hardware component, a component including fans 51, a power supply, cooling resources, etc.). The present disclosure provides for the device 100, which may organize the first component 47 and the second component 45 in a stacked fashion that may be easily removed from and returned into a sleeve 19 formed by components of the chassis 12. Advantageously, this sleeved, stacked, arrangement may facilitate improved ease-of-access to various components of the device 100, thereby improving the repair, maintenance, and/or enhancement of the device 100. Accordingly, the device may include the chassis 12, the first component 47, and the second component 45.

Figure 2:
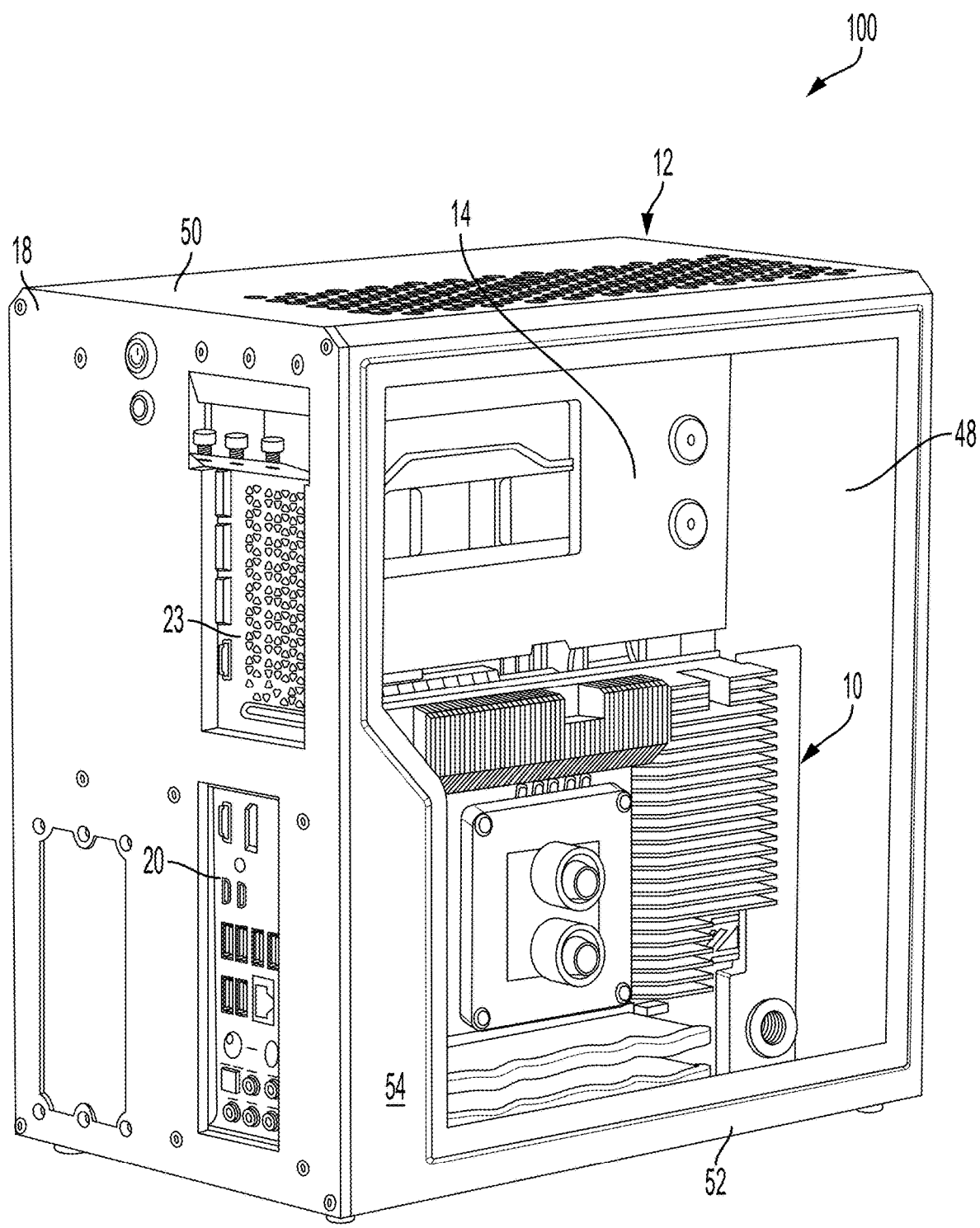
FIG. 2 is rear perspective view of the computing device of FIG. 1, according to some embodiments of the present disclosure.
Figure 3:
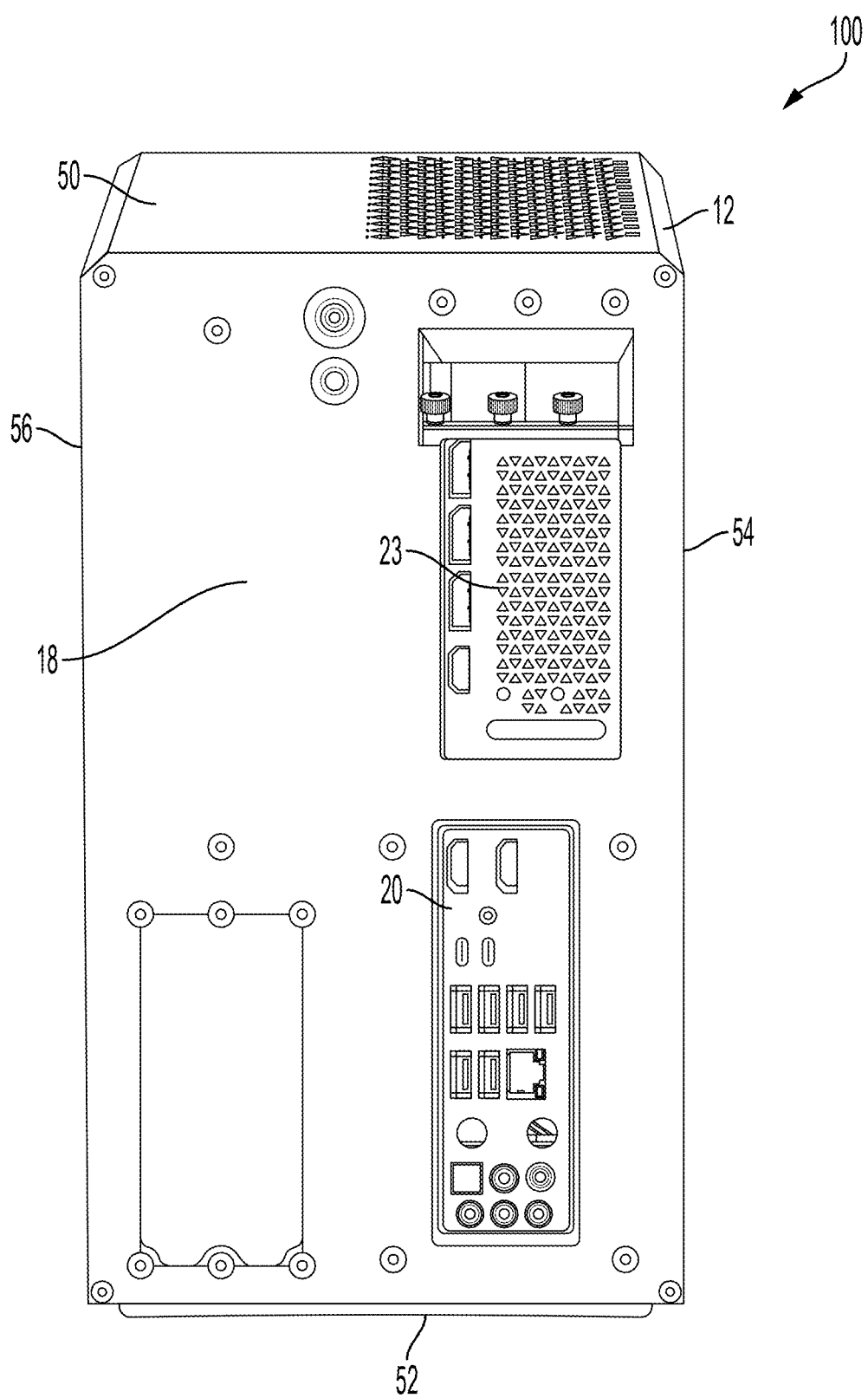
FIG. 3 is a rear view of the computing device of FIG. 1, according to some embodiments of the present disclosure.
Figure 4:
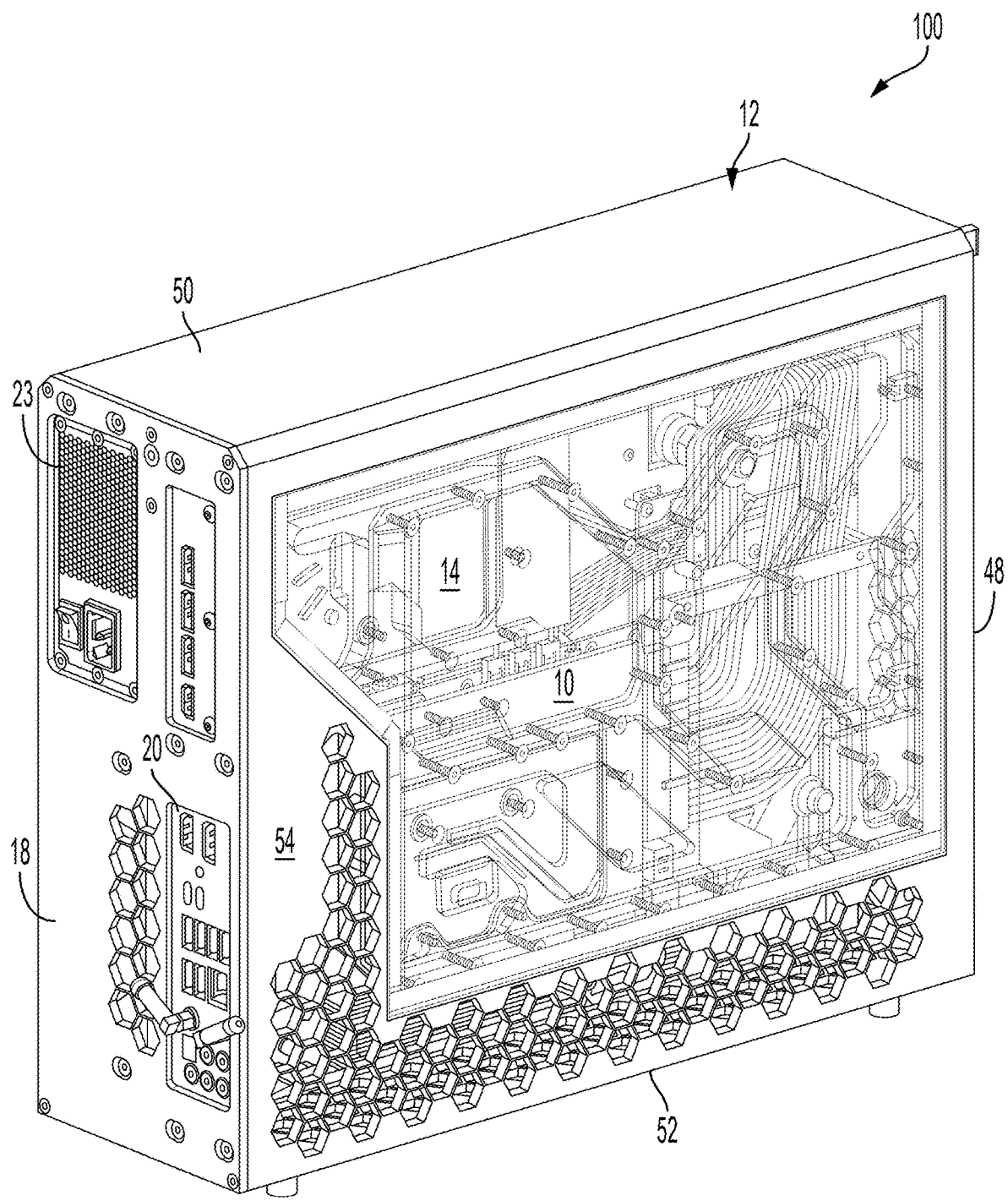
FIG. 4 is a rear perspective view of a computing device, according to further embodiments of the present disclosure.
Figure 5:
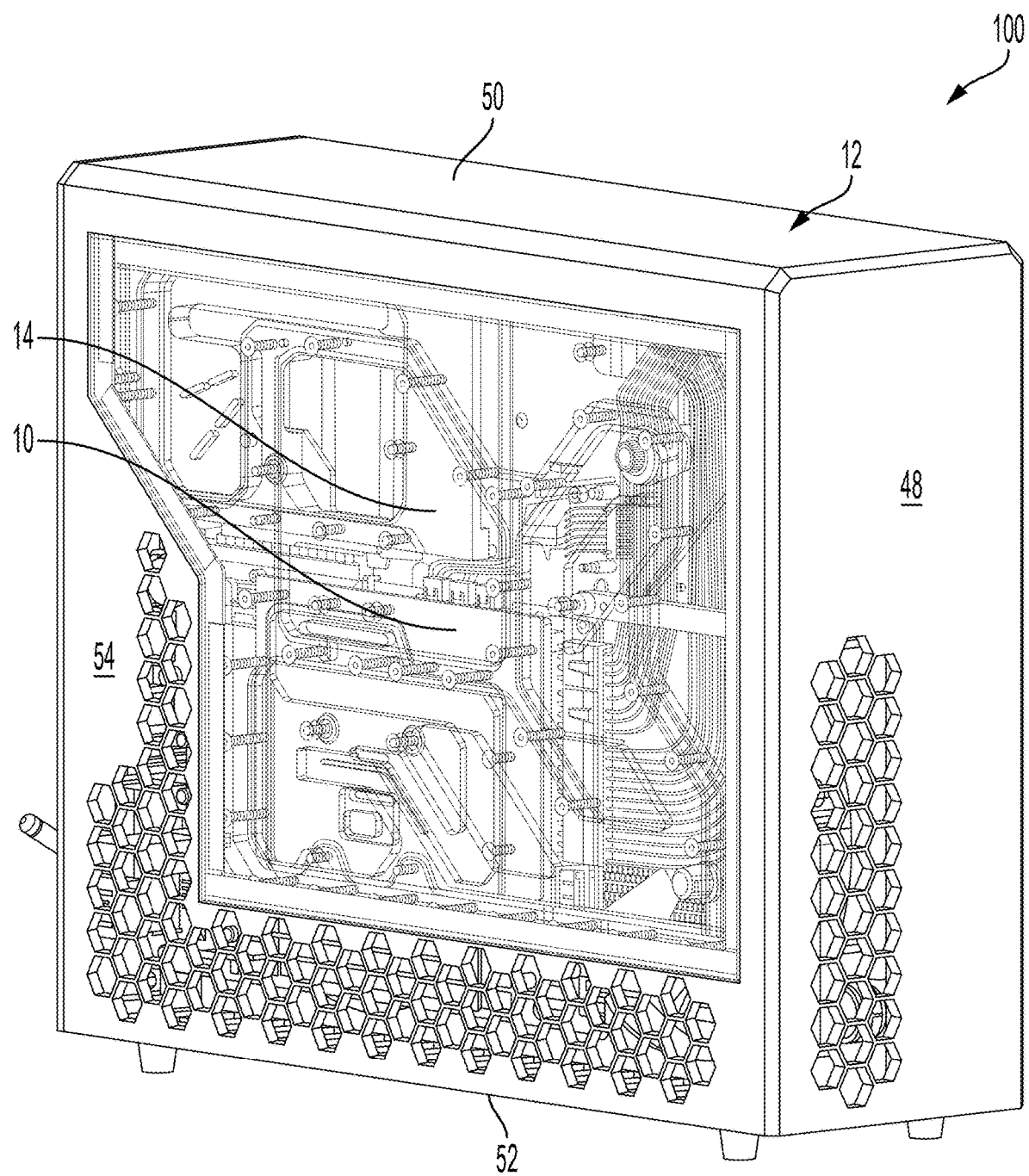
FIG. 5 is front perspective view of the computing device of FIG. 4, according to some embodiments of the present disclosure.
Figure 6:
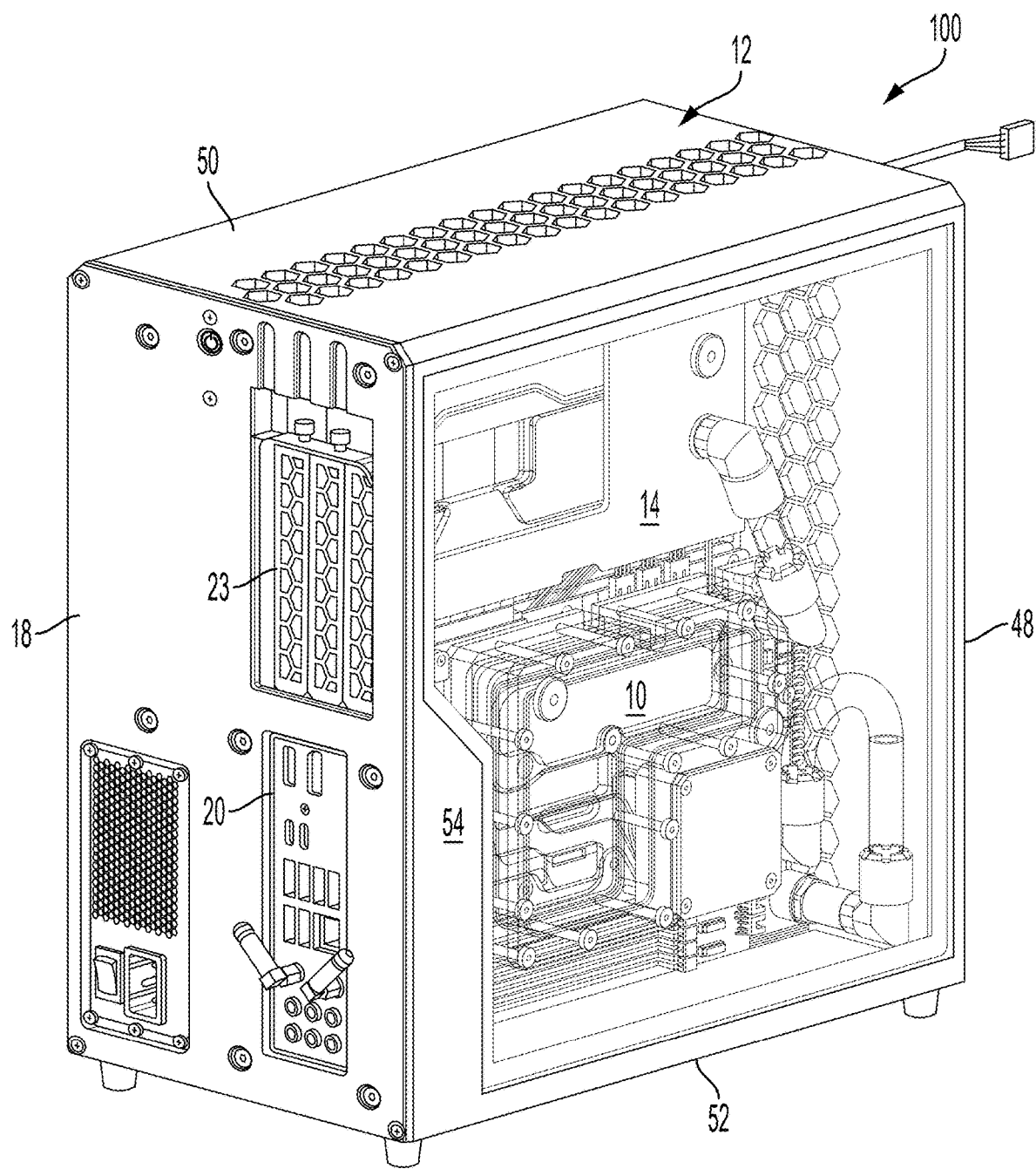
FIG. 6 is a rear perspective view of a computing device, according to even further embodiments of the present disclosure.
Figure 7:
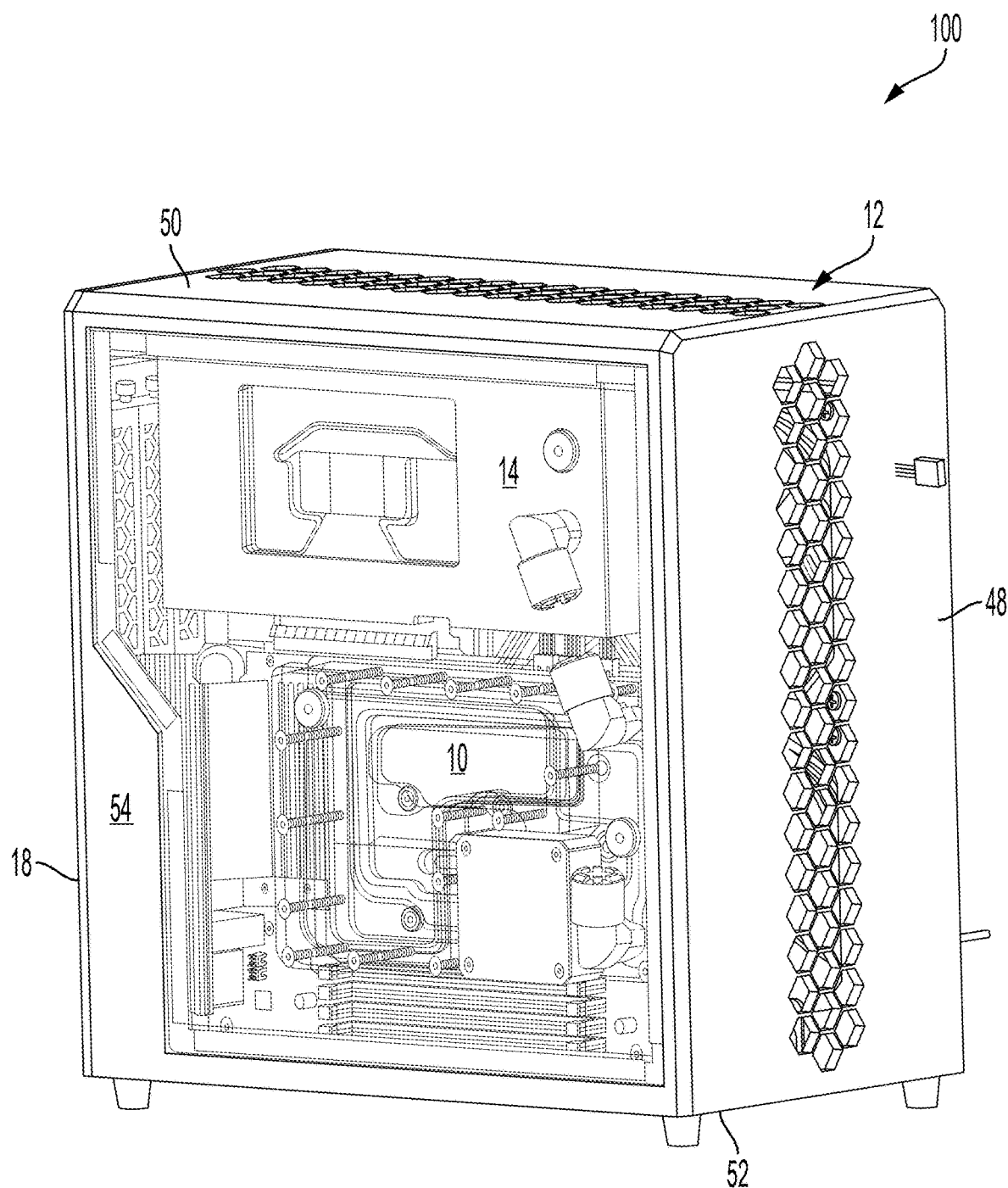
FIG. 7 is front perspective view of the computing device of FIG. 6, according to some embodiments of the present disclosure.

For instance, FIGS. 1-3 depict the device 100 according to some embodiments of the present disclosure; FIGS. 4 and 5 depict the device 100 according to alternative embodiments of the present disclosure; and FIGS. 6 and 7 depict the device 100 according to further embodiments of the present disclosure.

The device 100 may include a motherboard 10 (e.g., a printed circuit board). For example, the motherboard 10 may include a central processing unit ("CPU") and other associated electronics, such as control circuitry and other electronics. As a first example, device 100 may include a memory module disposed on the motherboard 10. For instance, such memory module may be a memory card such as a random access memory ("RAM") card. As a second example, the device 100 may include input/output ("IO") connectors 21, which may facilitate the connections of IO devices such as a video monitor, mouse, or printer to the control circuitry and other electronics of the device 100.

In some embodiments, the device 100 includes an add-on card 14 in communication with the motherboard 10. Generally, the add-on card 14 (e.g., an expansion board, an expansion card, etc.) may be a second component that can be connected to the components of the motherboard 10 in order to enhance the functionality of the device 100. For example, the add-on card 14 may be a graphics processing unit ("GPU"). The add-on card 14 may be positioned vertically above the motherboard 10. For instance, an expansion connector 26 may be positioned on the motherboard 10 in order to facilitate such vertical connection between the motherboard 10 and the add-on card 14. Generally, the device 100 may form the chassis 12 that includes a vertical panel 48 and a removable panel 18 oriented parallel to the vertical panel 48. The chassis 12 may further include a top panel 50, a bottom panel 52, a right panel 54, and a left panel 56 extending between the vertical panel 48 and the removable panel 18. As discussed in greater detail below, the chassis 12 may be configured to house the electronic and working second components of the device 100.

In some embodiments, the removable panel 18 includes an interface 20 configured to secure the aforementioned one or more IO connectors 21 on the motherboard 10. Additionally, the removable panel 18 may include an IO shield 23. The IO shield 23 may be aligned with the add-on card 14. The IO shield 23 may be configured to secure additional IO connectors disposed on the add-on card 14. In some embodiments, particularly in cases where the add-on card 14 is a GPU, the IO shield 23 may include a vent. While the position of the IO shield 23 may be moved to any suitable location(s) on the chassis 12, it should be appreciated that the parallel position of the add-on card 14 relative to the motherboard 10 may advantageously allow a free stream of air to pass through the chassis 12, thus enhancing the cooling effects resulting from air travel throughout the chassis. Moreover, the chassis 12 may be reduced in terms of footprint size due to the vertically structured arrangement of the motherboard 10 and the add-on card 14 (e.g., the first component 47 discussed in greater detail below with reference to FIGS. 8-18).

Figure 8:
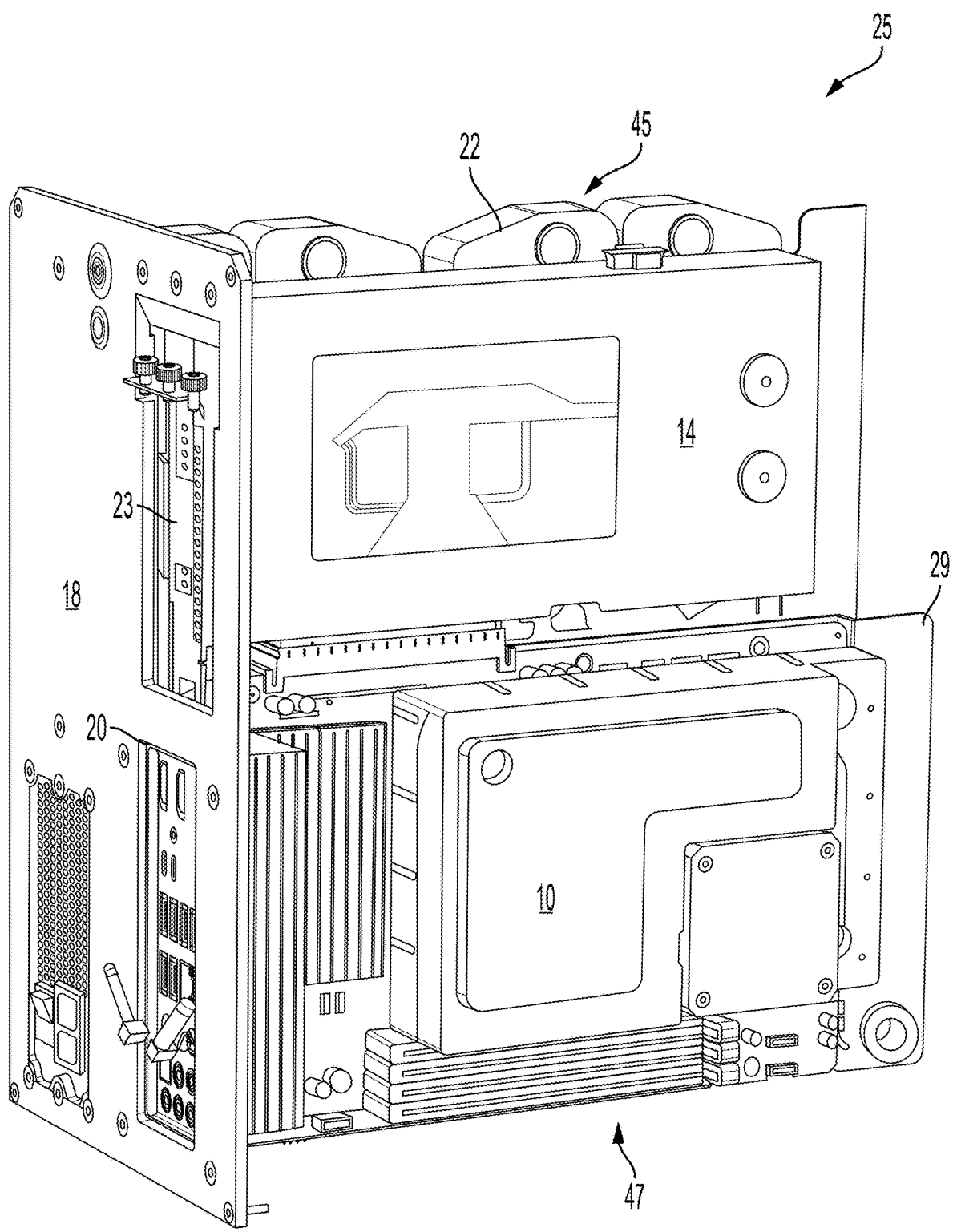
FIG. 8 is a rear perspective view of an insert portion of a computing device, according to some embodiments of the present disclosure.
Figure 9:
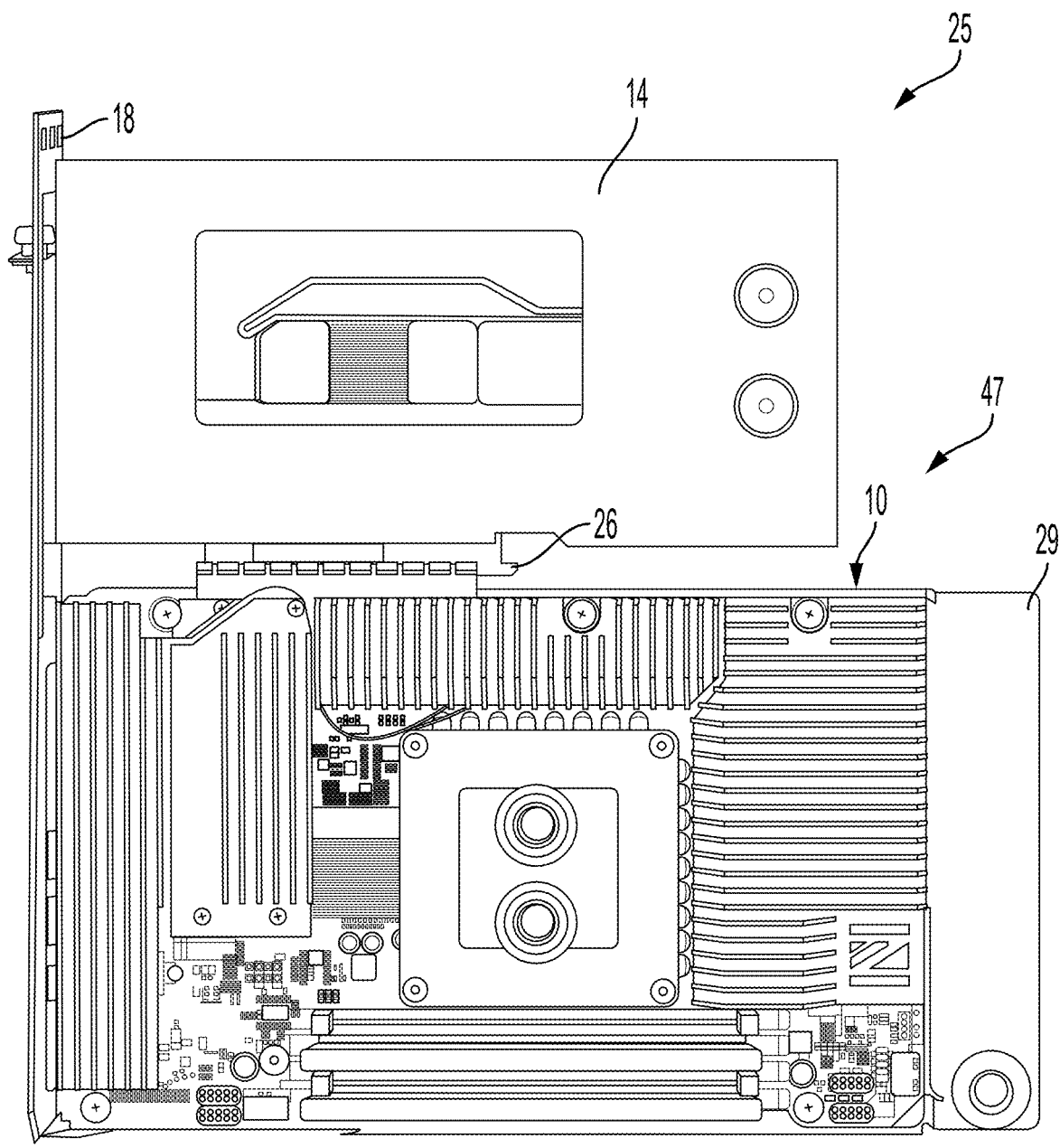
FIG. 9 is a rear perspective view of an insert portion of a computing device, according to further embodiments of the present disclosure.
Figure 10:
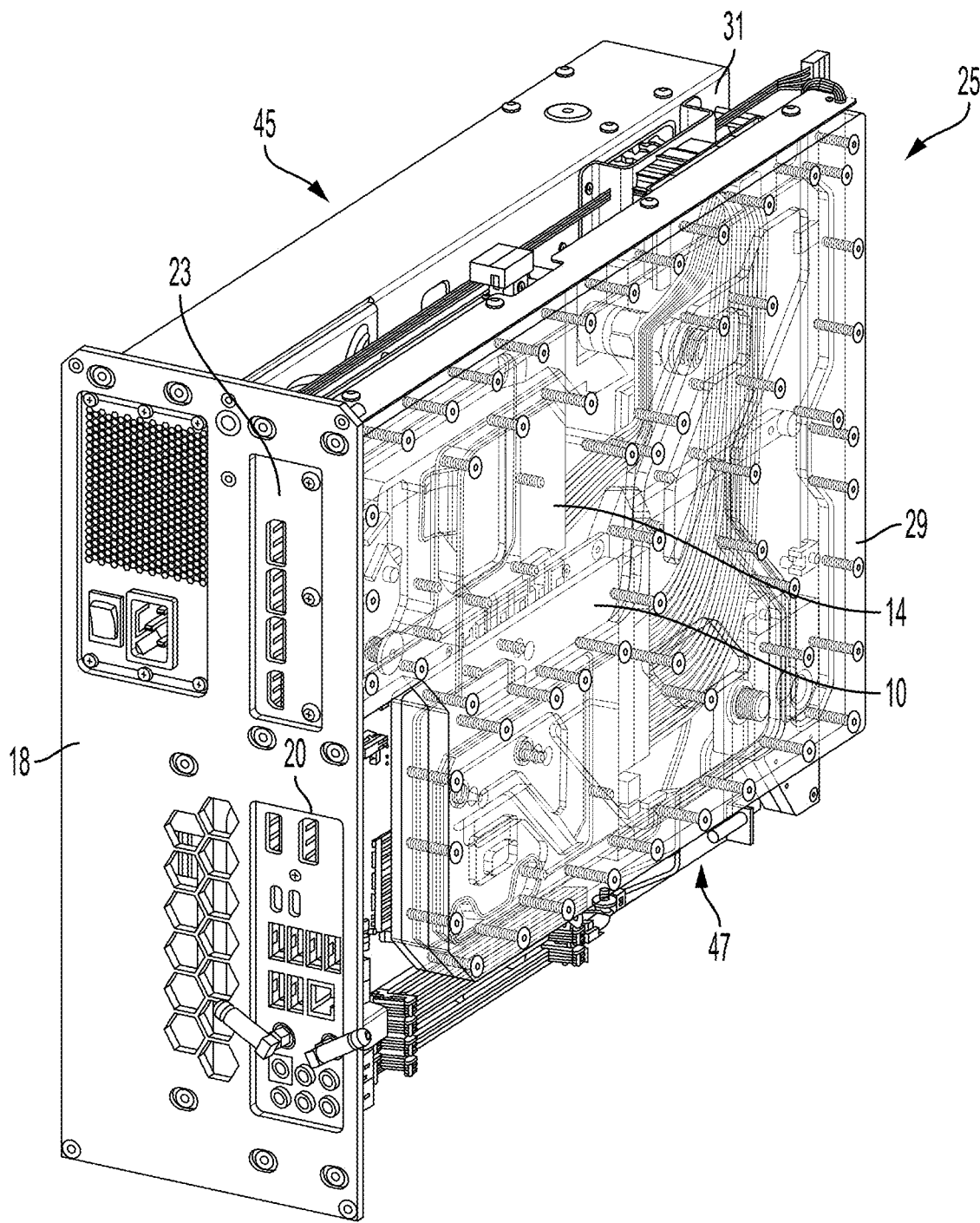
FIG. 10 is a rear perspective view of an insert portion of a computing device, according to even further embodiments of the present disclosure.

Referring now to FIGS. 8-18, the motherboard 10, the removable panel 18, and, in some embodiments, the add-on card 14, may be components of a insert 25. As discussed in greater detail below, the insert 25 may provide for the first component 47 and the second component 45 in a stacked fashion, which may be advantageous for the sleeved configuration of the chassis 12 as discussed herein. FIG. 8 depicts the insert 25 according to some embodiments of the present disclosure; FIG. 9 depicts the insert 25 according to other embodiments of the present disclosure; FIGS. 10-14 depict the insert 25 according to further embodiments of the present disclosure; and FIGS. 15-18 depict the insert 25 according to even further embodiments of the present disclosure. The insert 25 may be insertable and removable from the sleeve 19, which is shown and discussed in further detail with reference to FIGS. 24-29.

As shown with particular reference to FIGS. 8 and 9, and as suggested above, the add-on card 14 may be disposed on the expansion connector 26, according to some embodiments of the present disclosure. The motherboard 10 and the add-on card 14 may be connected by the expansion connector 26 such that the add-on card 14 (or, more generally, the planar feature broadly defined by the shape of the add-on card 14) is oriented in parallel relative to the motherboard 10 (or, more generally, the planar feature broadly defined by the shape of the motherboard 10). In further embodiments, the add-on card 14 is coplanar with the motherboard 10. As shown, the add-on card 14 is positioned vertically above the motherboard 10. Of course, in further embodiments of the present disclosure, the add-on card is positioned below the motherboard 10, lateral to (e.g., to the left or right of) the motherboard 10, or in some other suitable relative positioning.

The insert 25 may include the removable panel 18, a first tray 29, and a second tray 31. For instance, the removable panel 18 may be oriented vertically (e.g., in order to form the typical housing of the computing device 100, parallel to a vertical axis 99 of the computing device 100—shown with particular reference to FIG. 11, etc.), and the first tray 29 and the second tray 31 may extend laterally therefrom (e.g., towards the vertical panel 48 of the fully assembled device 100, along a longitudinal axis 97 of the computing device 100—shown with particular reference to FIG. 11, etc.). The motherboard 10, along with various related electronics such as the add-on card 14, may form the aforementioned first component 47 vertically oriented and disposed on the first tray 29 (thus, the first tray 29 may be considered a "motherboard tray"). In other words, the first component 47 may include the motherboard 10 and be disposed on the first tray 29. The device 100 may further include the second component 45 separate from the first component 47. Thus, the first component 47 and the second component 45 in a stacked fashion relative to a lateral axis 95 of the computing device 100 (shown with particular reference to FIG. 11).

Figure 11:
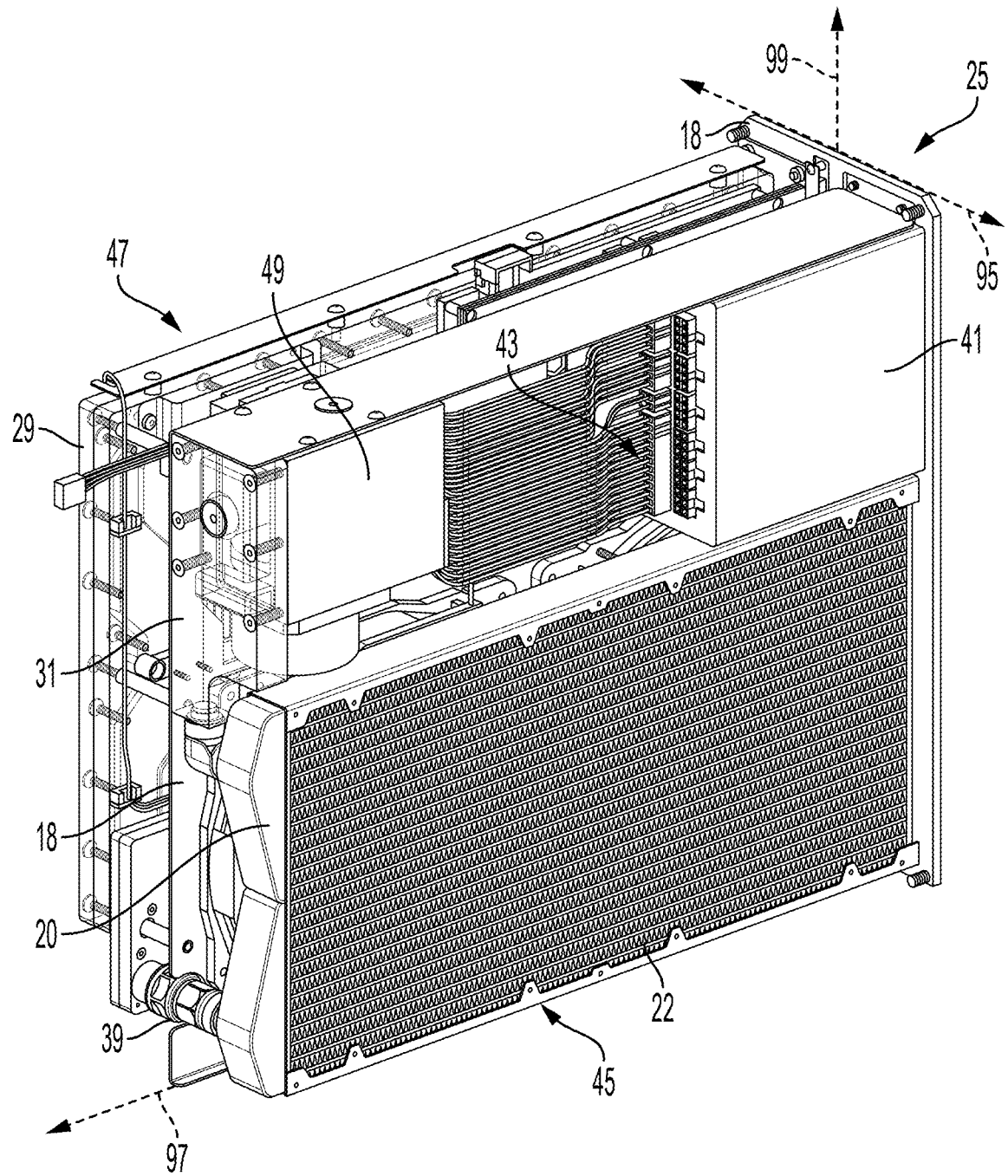
FIG. 11 is a front perspective view of the insert portion of FIG. 10, according to some embodiments of the present disclosure.

The second component 45 may include hardware such as a power supply 41, a coolant supply 49, and radiators 22 (shown with reference to FIG. 11, for example). Such components may be vertically oriented and disposed on the second tray 31 (thus, the second tray 31 may be considered a "hardware tray"). In other words, the second component 45 may include the power supply 41 (among other components) and be disposed on the second tray 31. As shown with particular reference to FIGS. 13 and 17, the power supply 41 on the second component 45 may be connected to the first component 47 via power connectors 43, which may be easily accessible form the side of the insert 25. Thus, when a user has removed the insert 25 from the sleeve 19 as discussed herein, the power connectors 43 may be easily accessed and disconnected in order to facilitate repair and/or maintenance operations.

The first tray 29 may be oriented in parallel relative to the second tray 31. Furthermore, the first tray 29 and the second tray 31 may be vertically oriented. Thus, the insert 25 may generally form two parallel components extending from the removable panel 18 along the longitudinal axis 97, and separated by a distance along the lateral axis 95 of the computing device 100: the first component 47 secured by the first tray 29, and the second component 45 secured by the second tray 31.

As shown with particular reference to FIGS. 10-14, the first tray 29 may be an acrylic "mono-block," though which various fasteners may extend in order to secure the first component 47 (e.g., the motherboard 10) to the first tray 29. In other embodiments, and as shown with particular reference to FIGS. 8, 9, and 15-18, the first tray 29 may be a standard hardware panel. Depending on the implementation, the second tray 31 may be a standard hardware panel.

As mentioned above, the first tray 29 and the second tray 31 may each extend from the removable panel 18. In some embodiments, each of the first tray 29 and the second tray 31 are secured to the removable panel 18 via one or more mechanical fasteners. The first tray 29 may be secured in place relative to the second tray 31 along the lateral axis 95 of the device 100 by one or more mechanical set-offs 37 (shown with particular reference to FIG. 14). In some embodiments, the mechanical set-offs 37 are secured to one of the first tray 29 or the second tray 31, and make contact with the other un-connected tray in order to provide such mechanical spacing. In other embodiments, the mechanical set-offs are secured to both the first tray 29 and the second tray 31.

Figure 12:
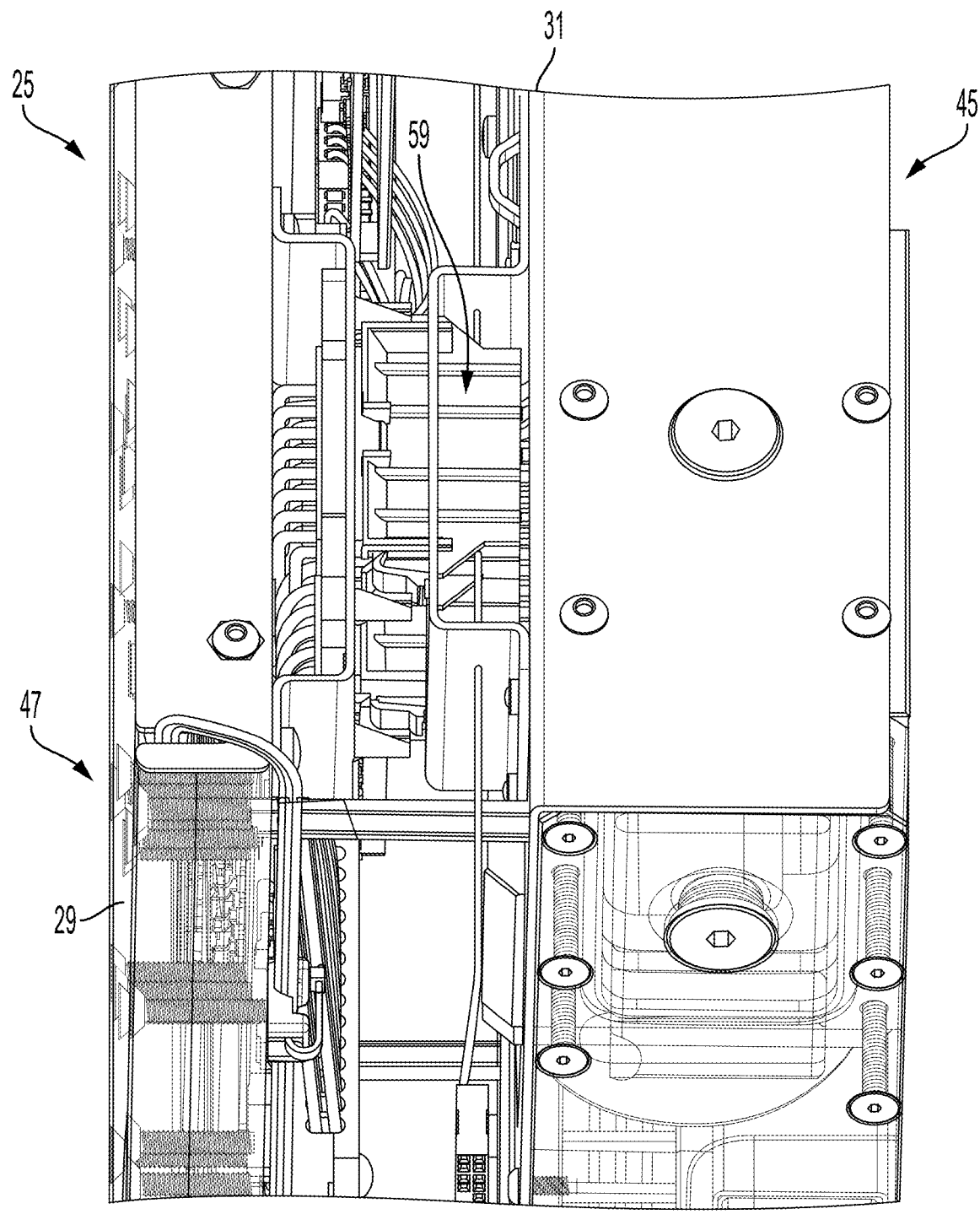
FIG. 12 is a partial top perspective view of the insert portion of FIG. 10, according to some embodiments of the present disclosure.
Figure 13:
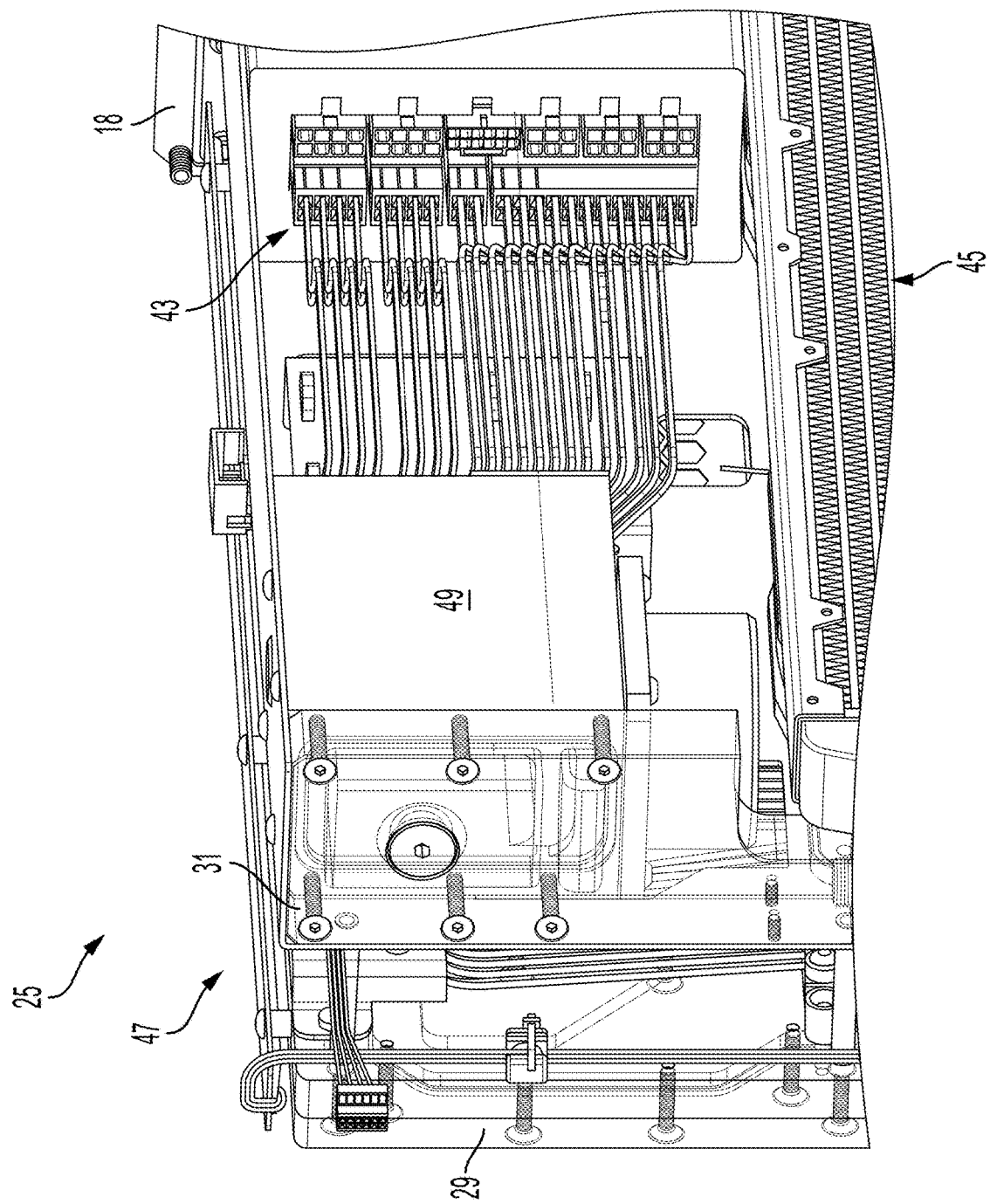
FIG. 13 is a partial elevated view of the insert portion of FIG. 10, according to some embodiments of the present disclosure.
Figure 14:
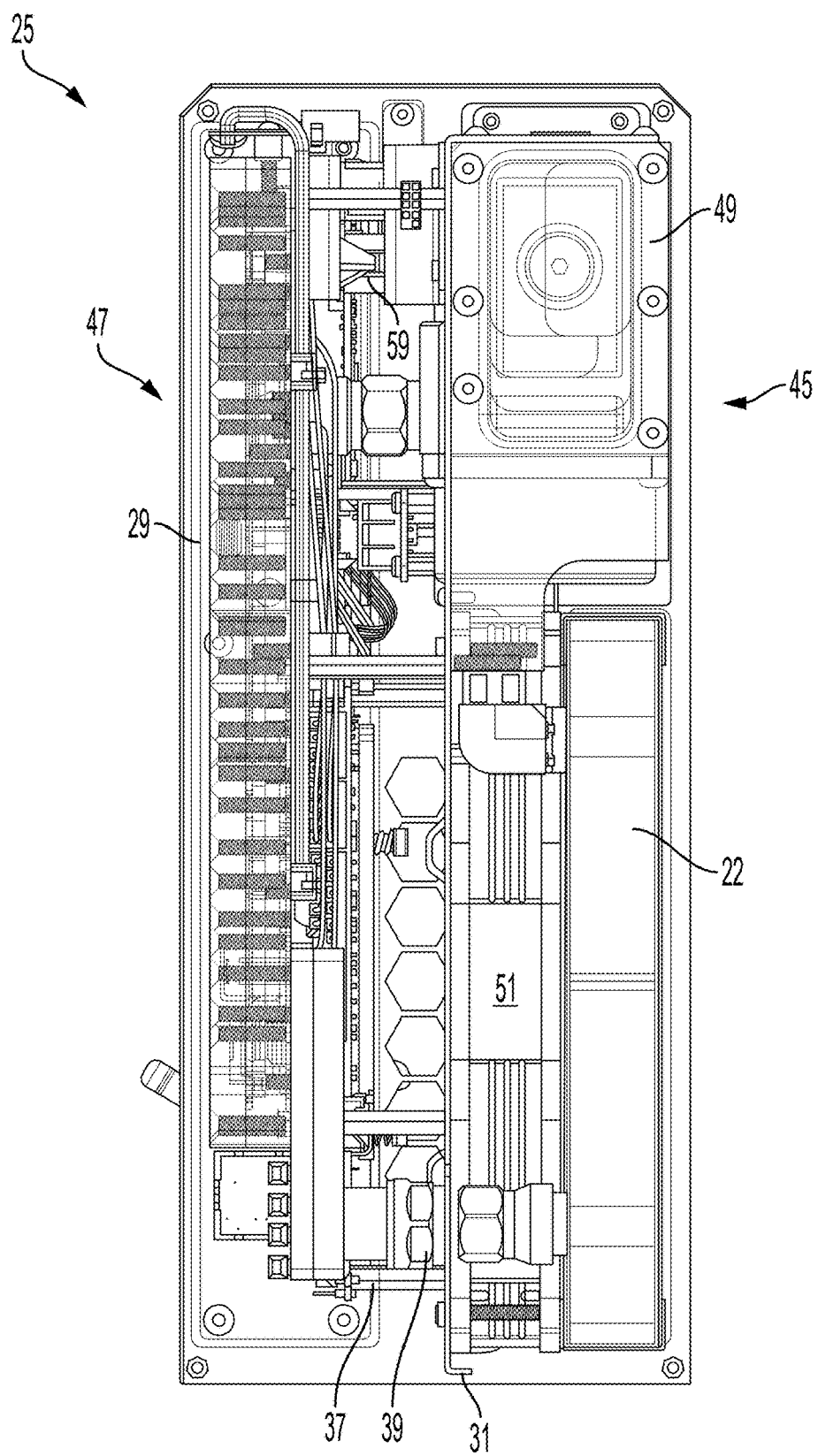
FIG. 14 is a front view of the insert portion of FIG. 10, according to some embodiments of the present disclosure.
Figure 15:
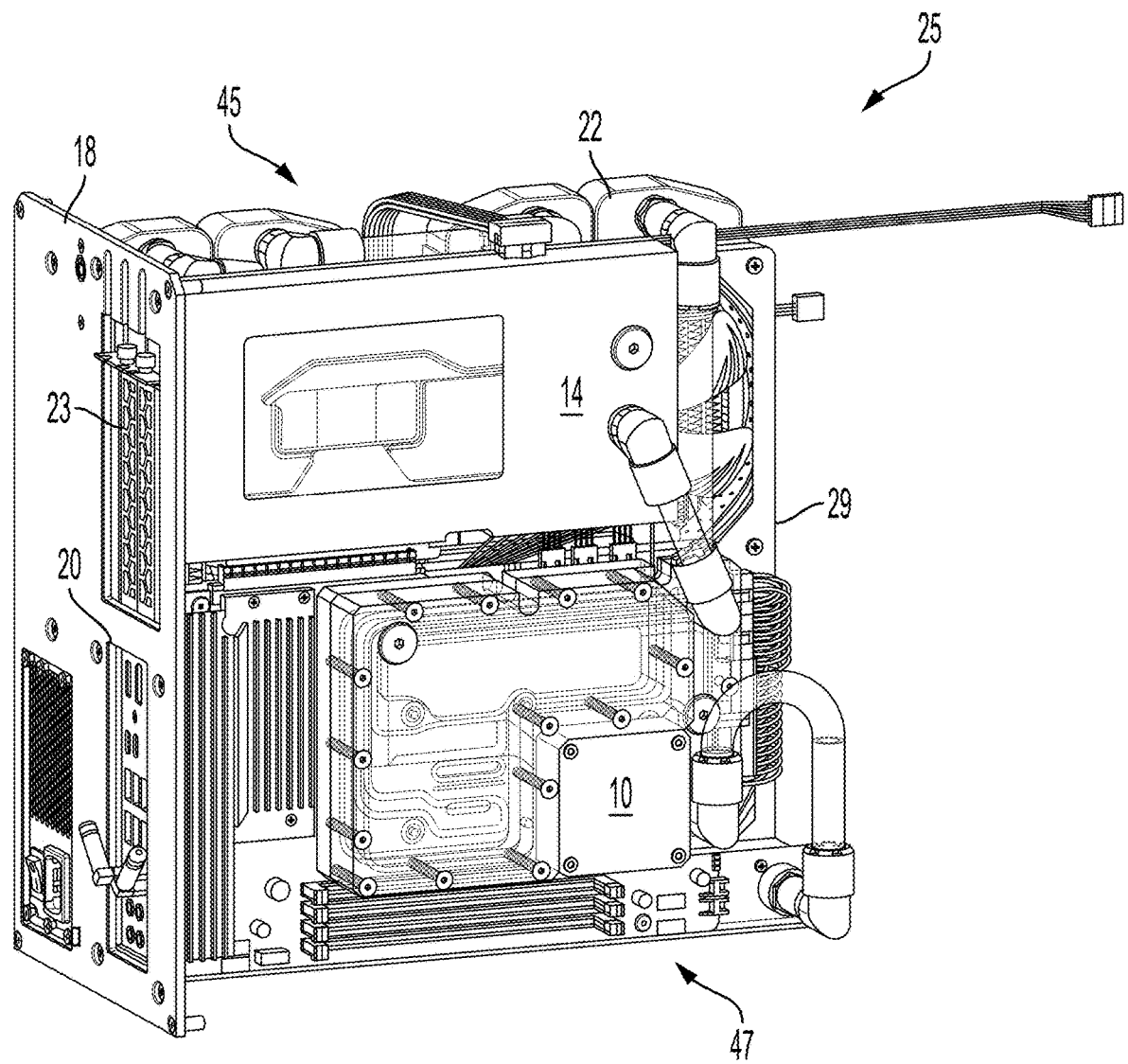
FIG. 15 is a rear perspective view of an insert portion of a computing device, according to additional embodiments of the present disclosure.
Figure 16:
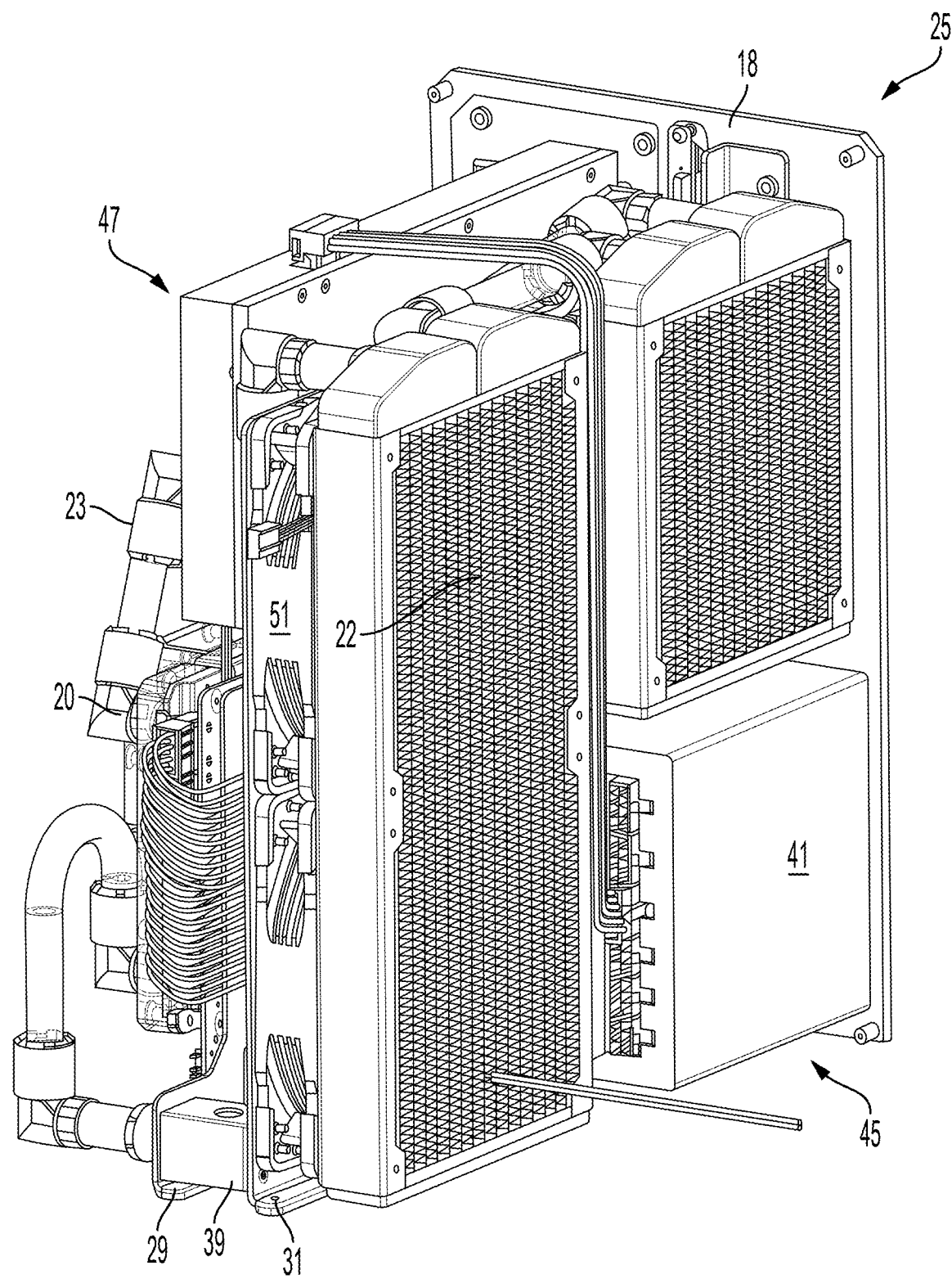
FIG. 16 is a front perspective view of the insert portion of FIG. 15, according to some embodiments of the present disclosure.
Figure 17:
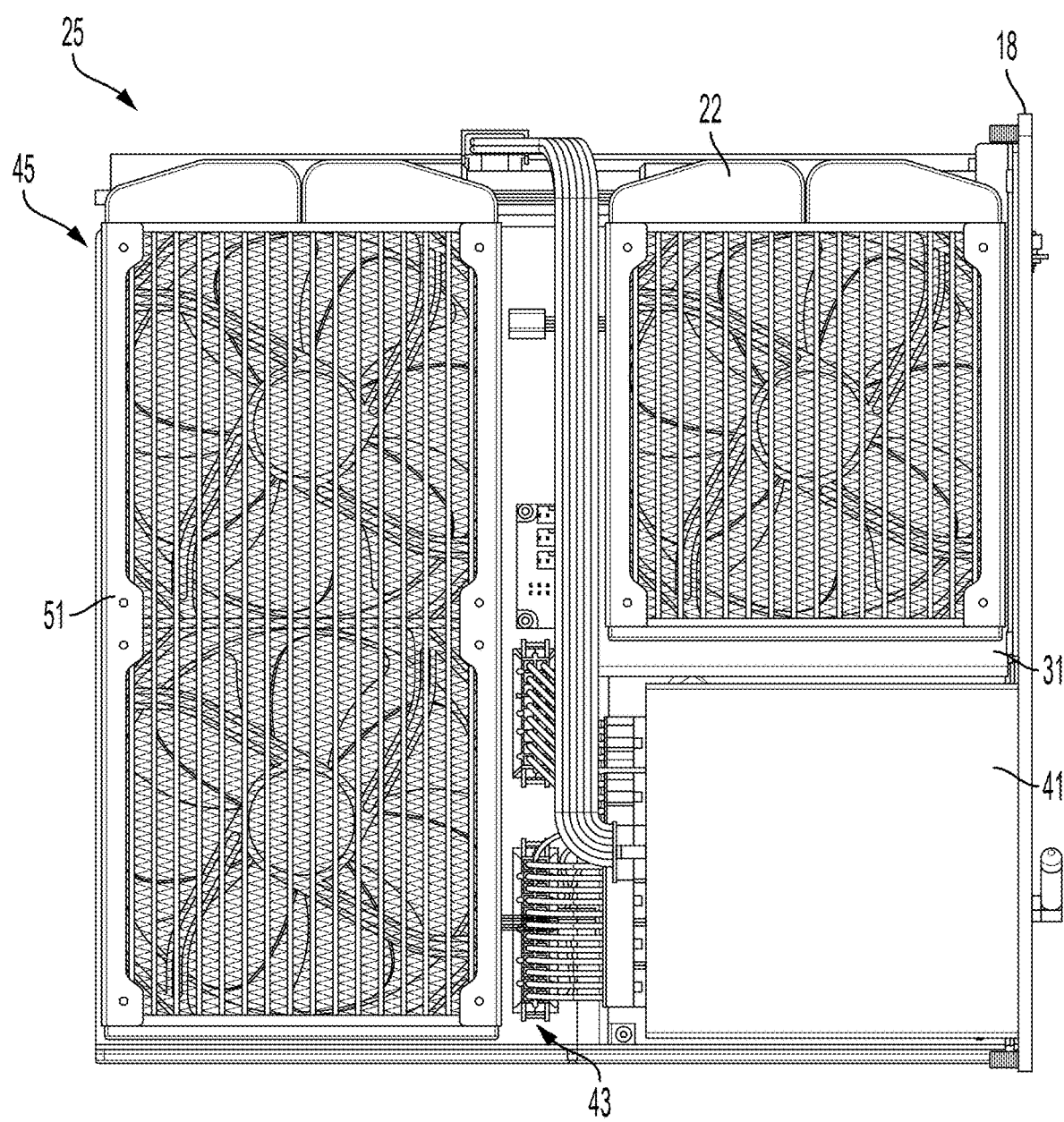
FIG. 17 is a side view of the insert portion of FIG. 15, according to some embodiments of the present disclosure.
Figure 18:
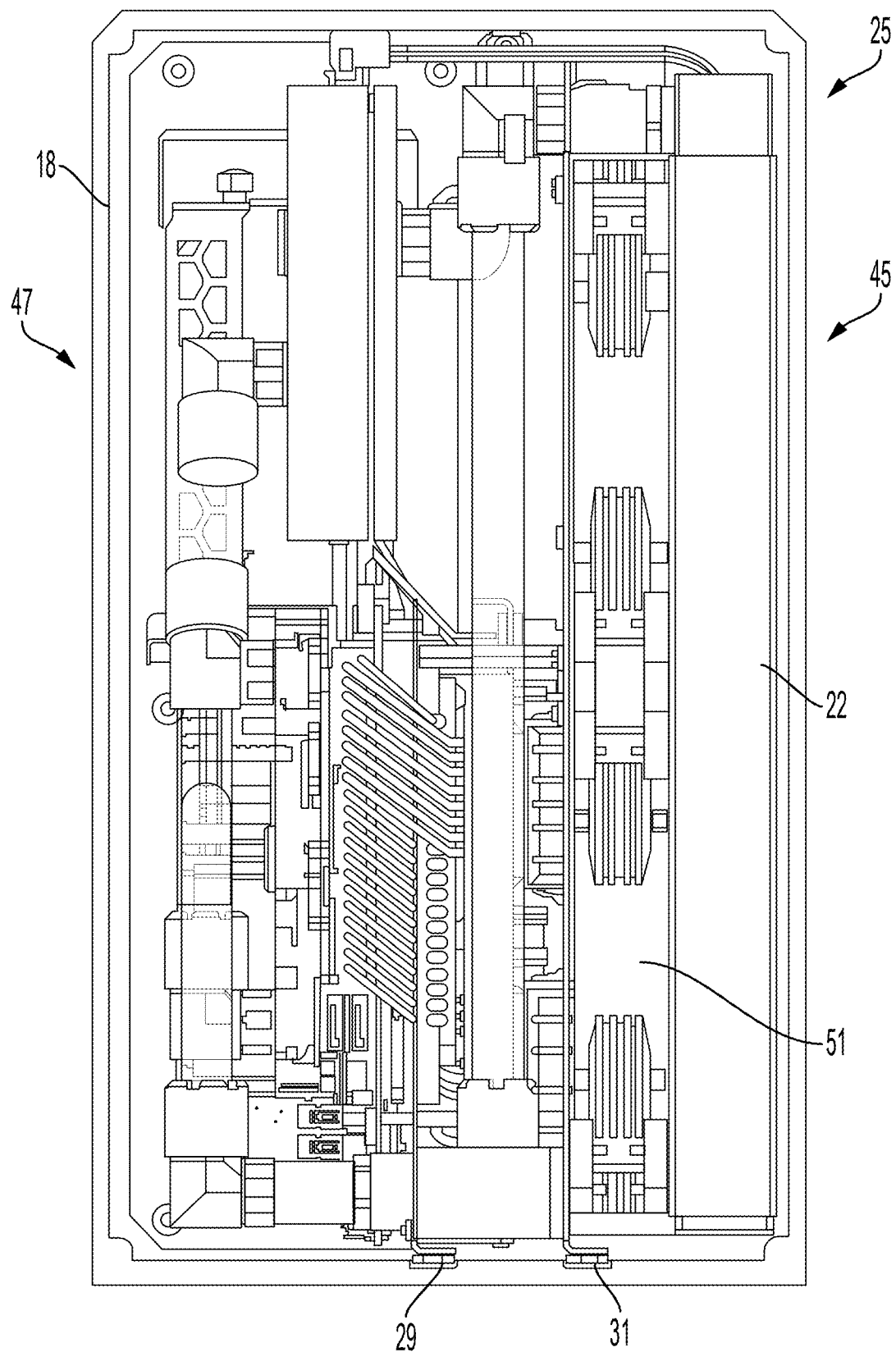
FIG. 18 is a front view of the insert portion of FIG. 15, according to some embodiments of the present disclosure.
Figure 19:
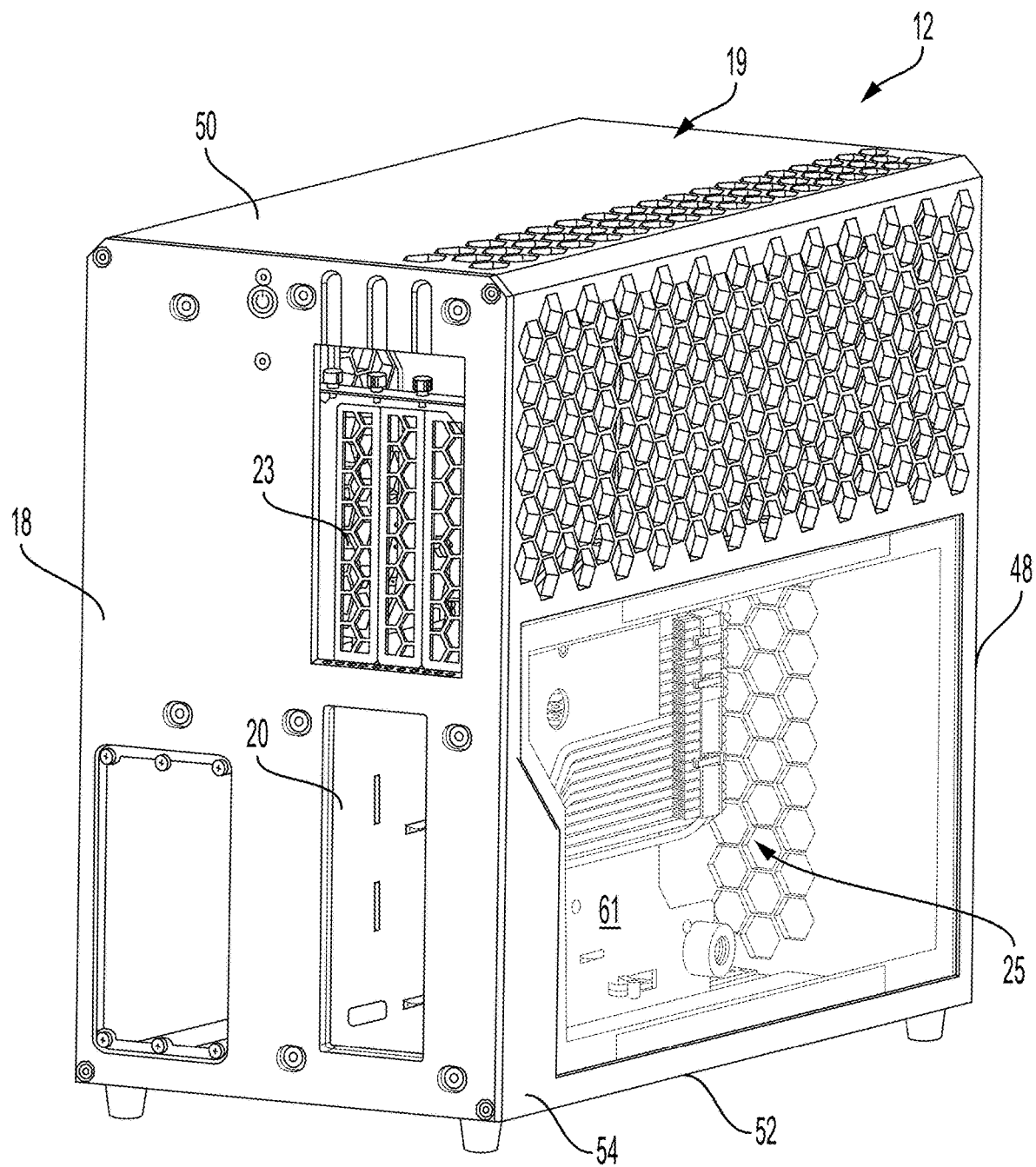
FIG. 19 is a rear perspective view of a chassis for a computing device, according to some embodiments of the present disclosure.
Figure 20:
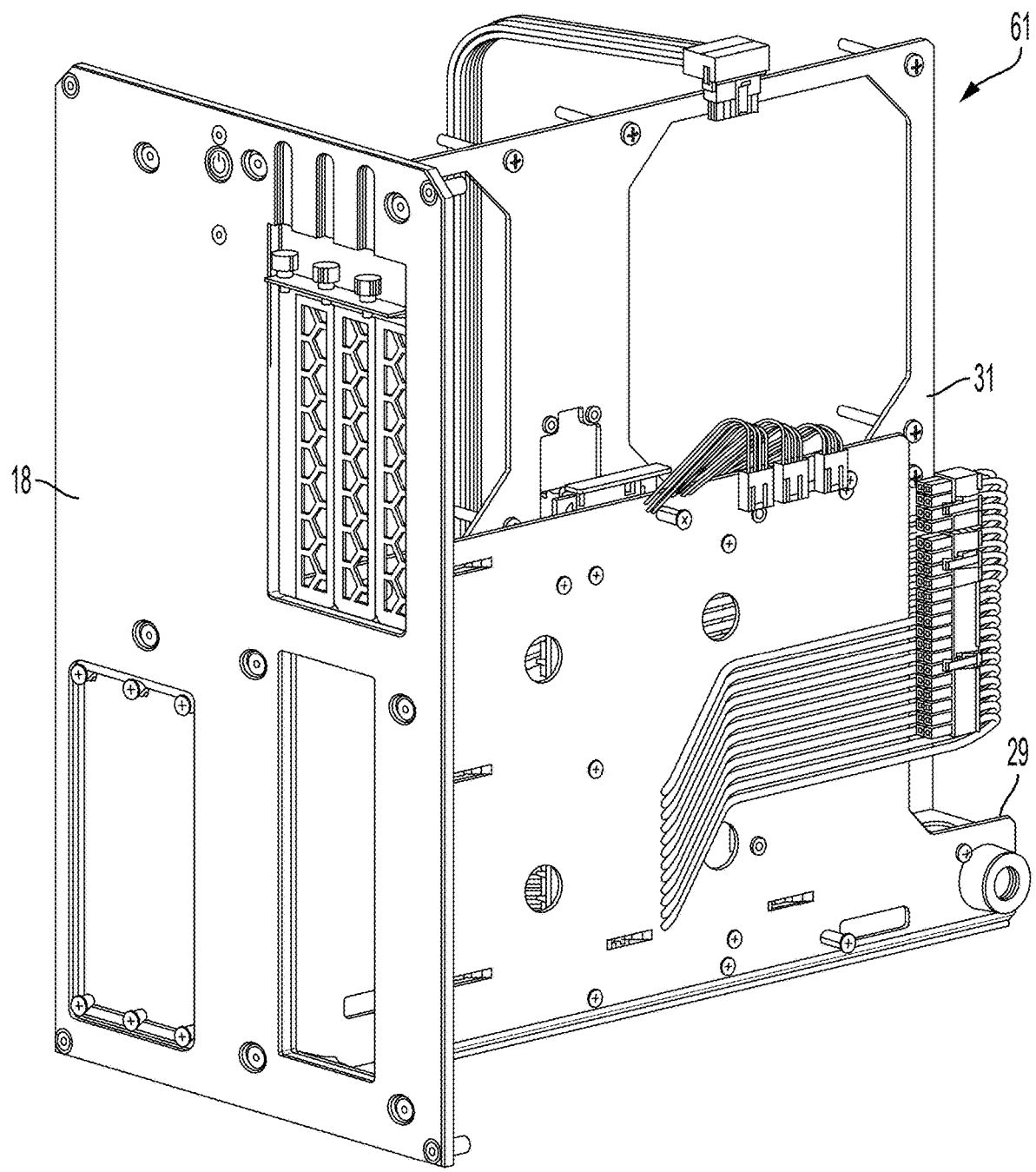
FIG. 20 is a rear perspective view of an insert frame for a computing device, according to some embodiments of the present disclosure.
Figure 21:
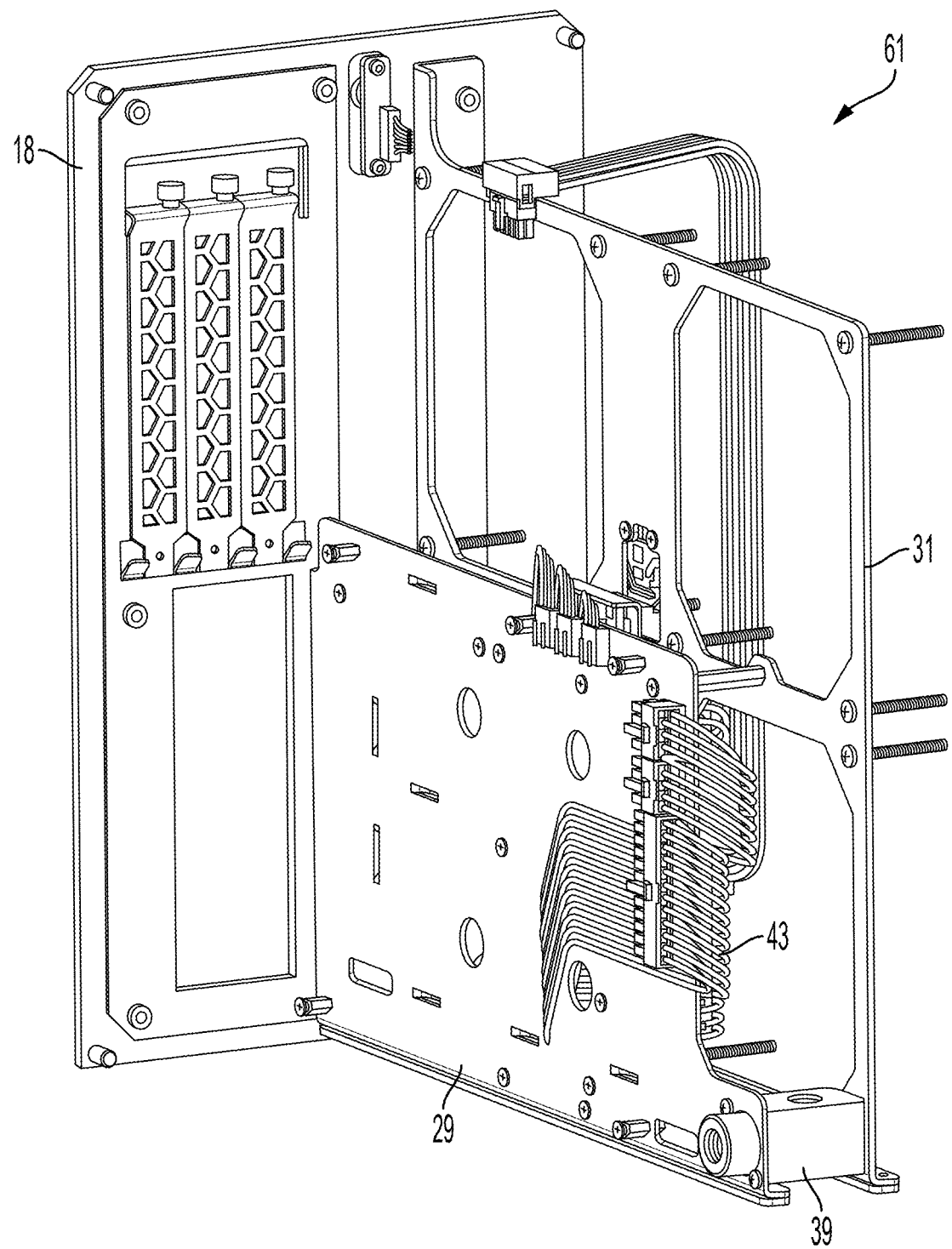
FIG. 21 is a front perspective view of the insert frame of FIG. 20, according to some embodiments of the present disclosure.
Figure 22:
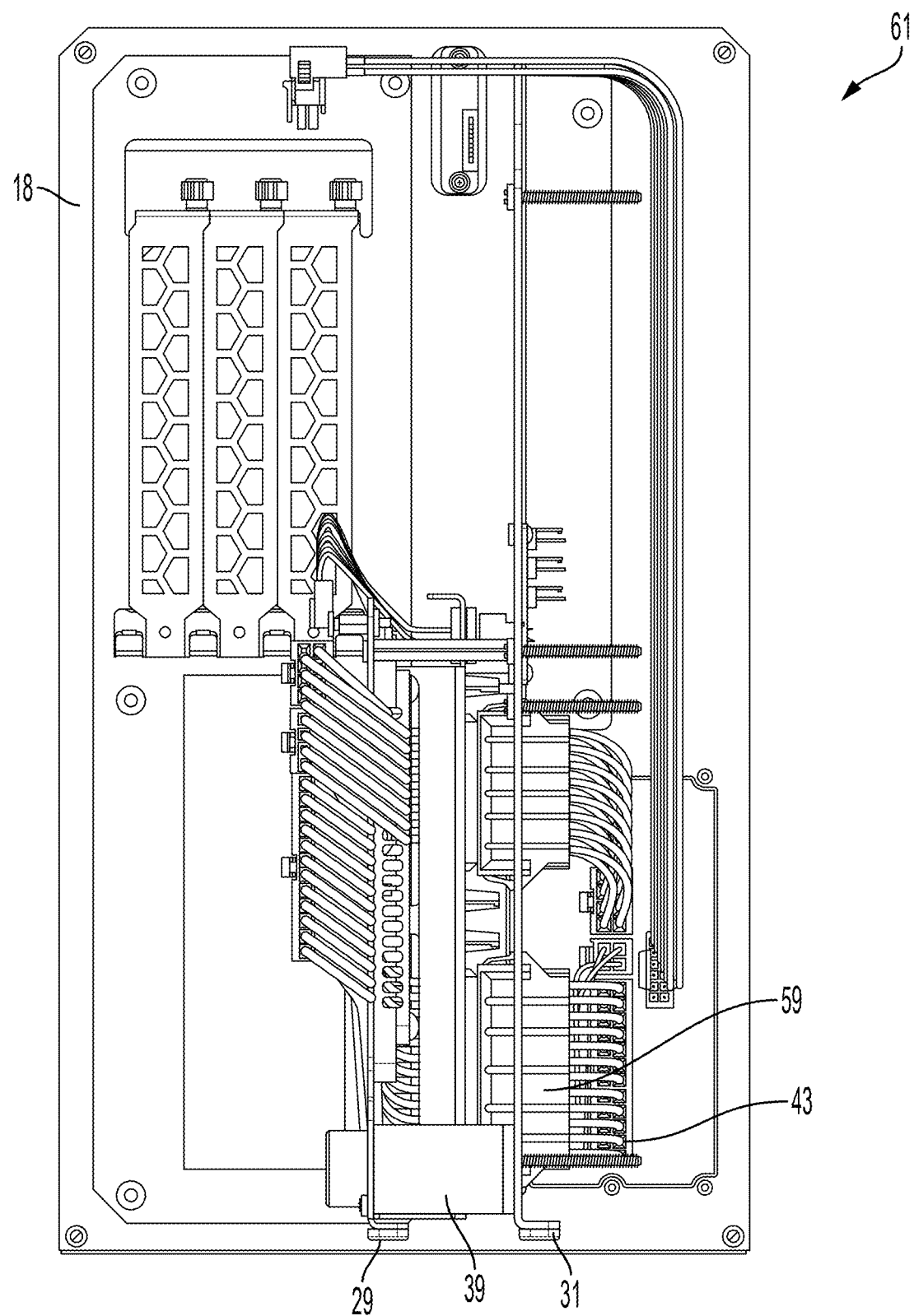
FIG. 22 is a front view of the insert frame of FIG. 20, according to some embodiments of the present disclosure.
Figure 23:
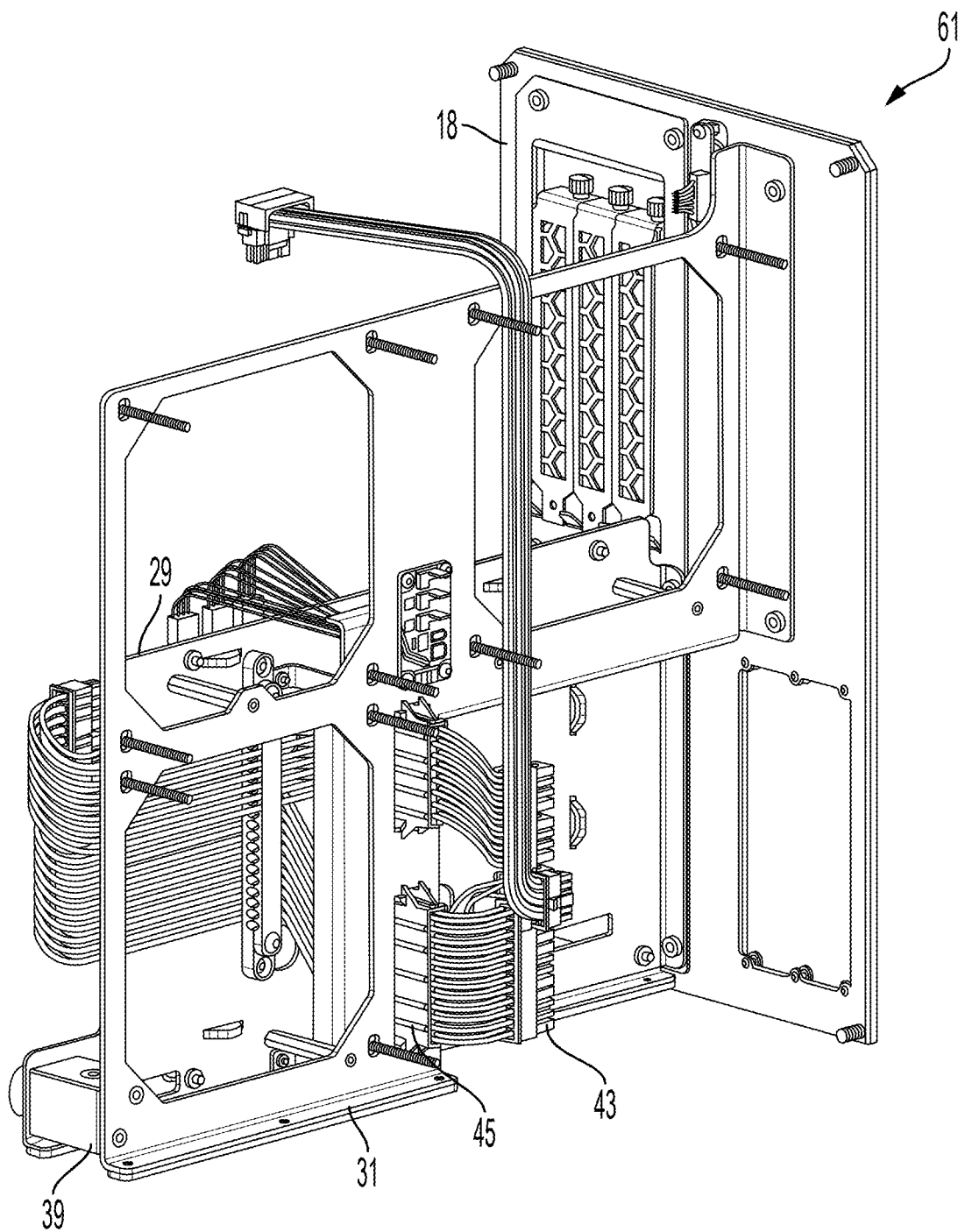
FIG. 23 is a side perspective view of the insert frame of FIG. 20, according to some embodiments of the present disclosure.
Figure 24:
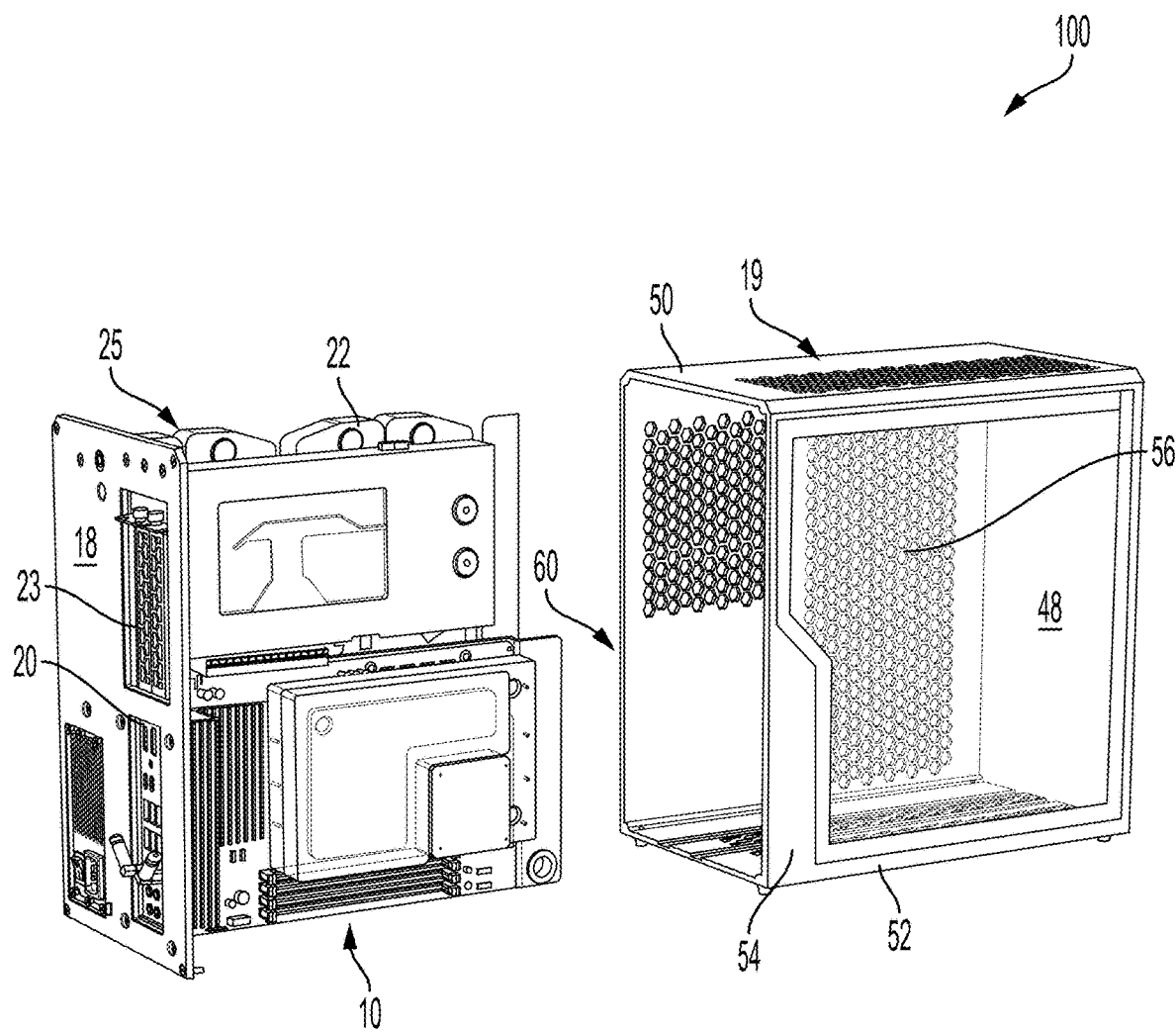
FIG. 24 is a rear perspective view of the insert portion of FIG. 8 and a sleeve for a computing device, according to some embodiments of the present disclosure.
Figure 25:
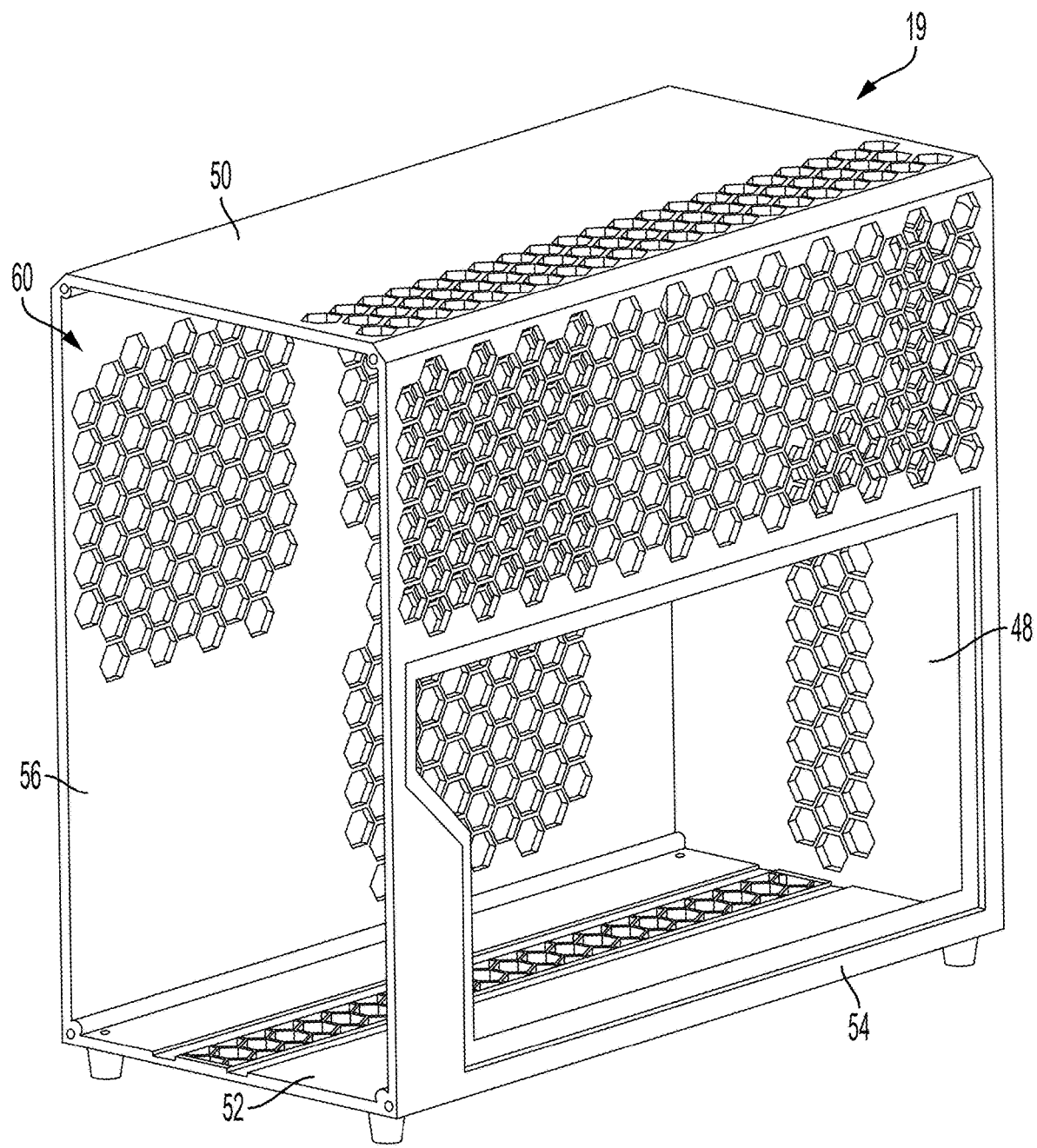
FIG. 25 is a rear perspective view of a sleeve for a computing device, according to further embodiments of the present disclosure.
Figure 26:
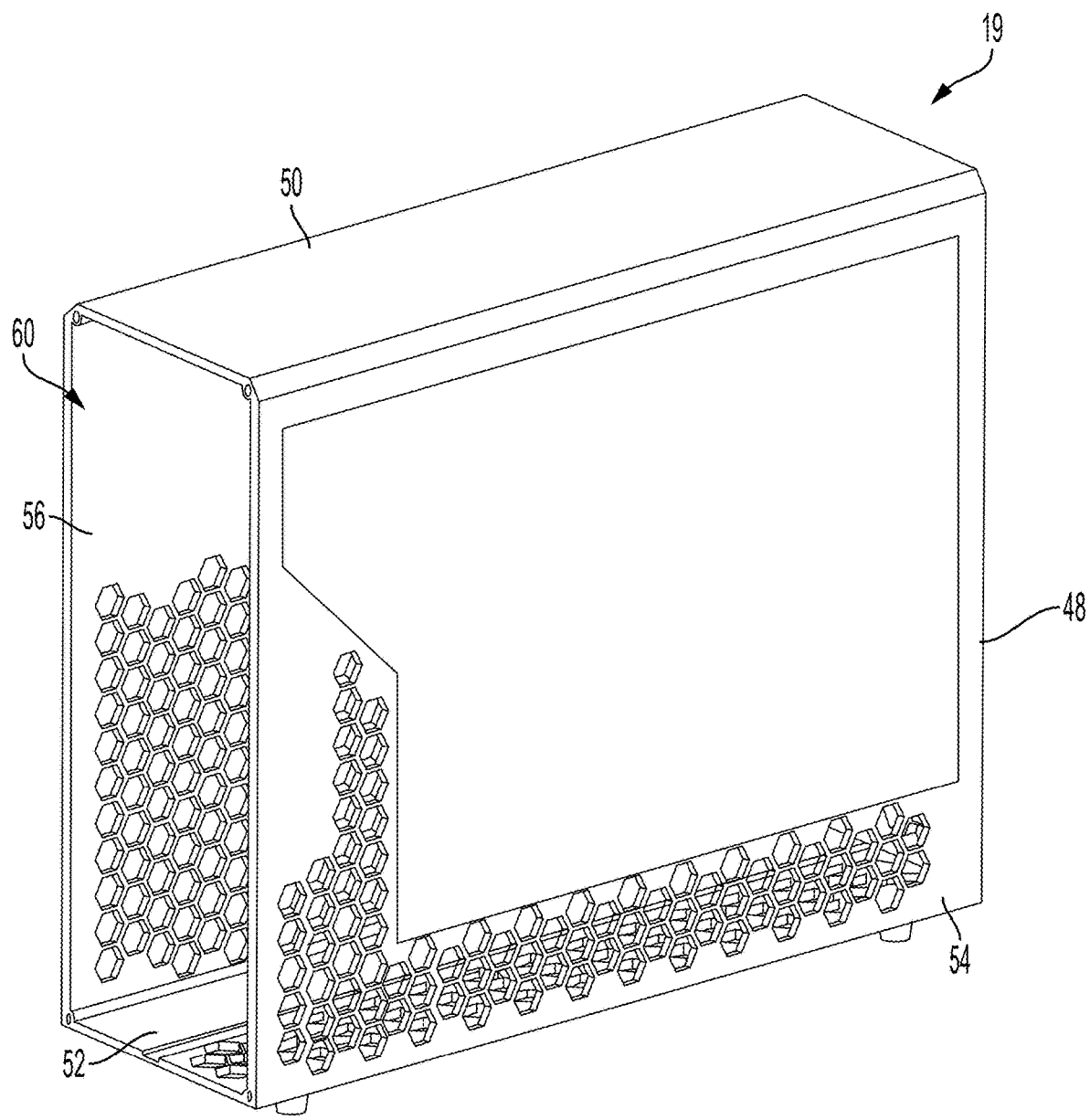
FIG. 26 is a rear perspective view of a sleeve for a computing device, according to even further embodiments of the present disclosure.

As shown with particular reference to FIGS. 12 and 14, the first tray 29 may include a male or female component of a blind mate interface connector such as a Milli-Grid Blind Mate Interface ("BMI") connector 59 (or other suitable blind mate connectors), and the second tray 31 may include a corresponding component of the BMI connector 59. The BMI connector 59 may provide an easily removable connection between the electronic components of the first component 47 and the second component 45. In this sense, the first component 47 and the second component 45 may be in electrical connection via the BMI connector 59. Thus, the first tray 29 (and the first component 47 secured thereto) can be easily removed from the second tray 31 (and the second component 45 secured thereto) for maintenance and upgrade, and vice-versa. For instance, a user may simply remove the insert 25 from the sleeve 19 (as shown and discussed in greater detail with reference to FIGS. 27-29), release the mechanical fasteners securing the desired tray to the removable panel 18 (from outside the chassis 12), and operate the easily accessible BMI connector 59 in order to separate the desired component for isolated maintenance.

Depending on the implementation, the insert 25 may include various components configured for maintaining the operating temperature of the device 100. In some embodiments, the second component 45 includes one or more radiators 22 (shown with particular reference to FIG. 11). Such radiators 22 may be configured to dispose of heat drawn by fans 51 (shown with particular reference to FIGS. 14, 16, and 17). Additionally, coolant may be circulated though the first component 47. As shown with particular reference to FIGS. 11 and 13, such coolant may be provided via a coolant supply 49. In some embodiments, coolant is transferred between the second component 45 and the first component 47 by one or more quick disconnect fittings 39 (shown with particular reference to FIGS. 11, 14, 16, 18). In this sense, the second component 45 may include the coolant supply 49, and the coolant supply 49 may be configured to transmit coolant between the first component 47 and the second component 45 via the quick-disconnect fittings 39. Thus, when the first component 47 or the second component 45 are removed for isolated maintenance as mentioned above, the quick disconnect fittings 39 may allow for such separation without the loss of any coolant presently in the circulation system between the first component 47 and the second component 45.

Referring now to FIGS. 19-23, the insert 25 may include an insert frame 61. The insert frame 61 may make up the mechanical components required to secure the electronic and other working second components of the insert 25. Thus, the insert frame 61 may include the removable panel 18, the first tray 29, and the second tray 31. Thus, the insert frame 61 may form an interior component of the chassis 12. Accordingly, the chassis 12 may generally include the sleeve 19 and the insert frame 61 insertable therein. In other words, the chassis 12 may, in total, include the vertical panel 48, the removable panel 18, the top panel 50, the bottom panel 52, the right panel 54, the left panel 56, the first tray 29 extending from the removable panel 18, and the second tray 31 extending from the removable panel 18.

Referring now to FIGS. 24-29, the sleeve 19 is shown, according to some embodiments of the present disclosure. As mentioned above, the insert 25 may be insertable and removable from the sleeve 19. The sleeve 19 may be formed as an open box by the vertical panel 48, the top panel 50, the bottom panel 52, the right panel 54, and the left panel 56. For instance, rear edges of the top panel 50, the bottom panel 52, the right panel 54, and the left panel 56 may form an opening 60 of the sleeve 19.

The removable panel 18 may be removably secured to (e.g., over the opening 60 of) the sleeve 19. In this sense, the sleeve 19 may include the vertical panel 48 oriented parallel to the removable panel 18; as well as the top panel 50, the bottom panel 52 oriented parallel to the top panel 50, the left panel 56, and the right panel 54 oriented parallel to the left panel 56, each extending between the vertical panel 48 and the removable panel 18. Thus, the chassis 12 may include the removable panel 18 detachably secured over the opening 60 formed by the sleeve 19. Furthermore, the chassis 12 may include the first tray 29 extending from the removable panel 18 into an interior 69 (shown with particular reference to FIG. 29) of the sleeve 19, and the second tray 31 extending from the removable panel 18 into the interior 69 of the sleeve 19.

When the removable panel 18 is secured to the sleeve 19 as shown, the chassis 12 may form a box as suggested above. Owing to the aforementioned box shape, the rear and vertical panels 18, 48 may be parallel (or substantially parallel), the top and bottom panels 50, 52 may be parallel (or substantially parallel), and the left and right panels 54, 56 may be parallel (or substantially parallel). Thus, the chassis 12 may form a box around the insert 25. Accordingly, and with additional reference to FIGS. 1-7, an outer portion of the chassis 12 may be provided when the insert 25 is inserted through the opening 60, such that the insert 25 is disposed in the sleeve 19, thus joining the removable panel 18 with the sleeve 19 and housing the electronic components of the insert 25 within the housing formed by the removable panel 18 and the sleeve 19.

Figure 27:
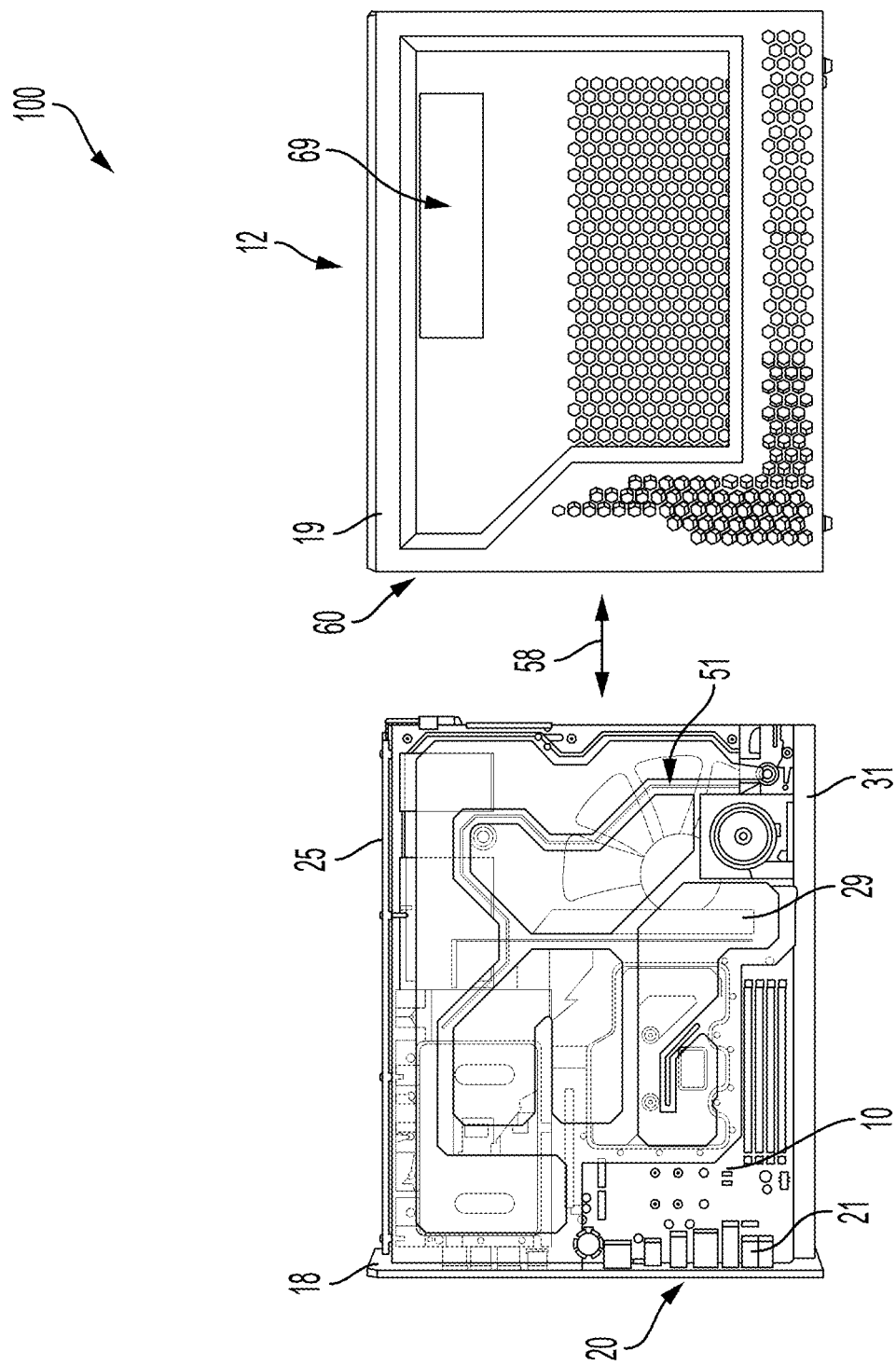
FIG. 27 is a side view of an insert being inserted into a sleeve for a computing device, according to some embodiments of the present disclosure.
Figure 28:
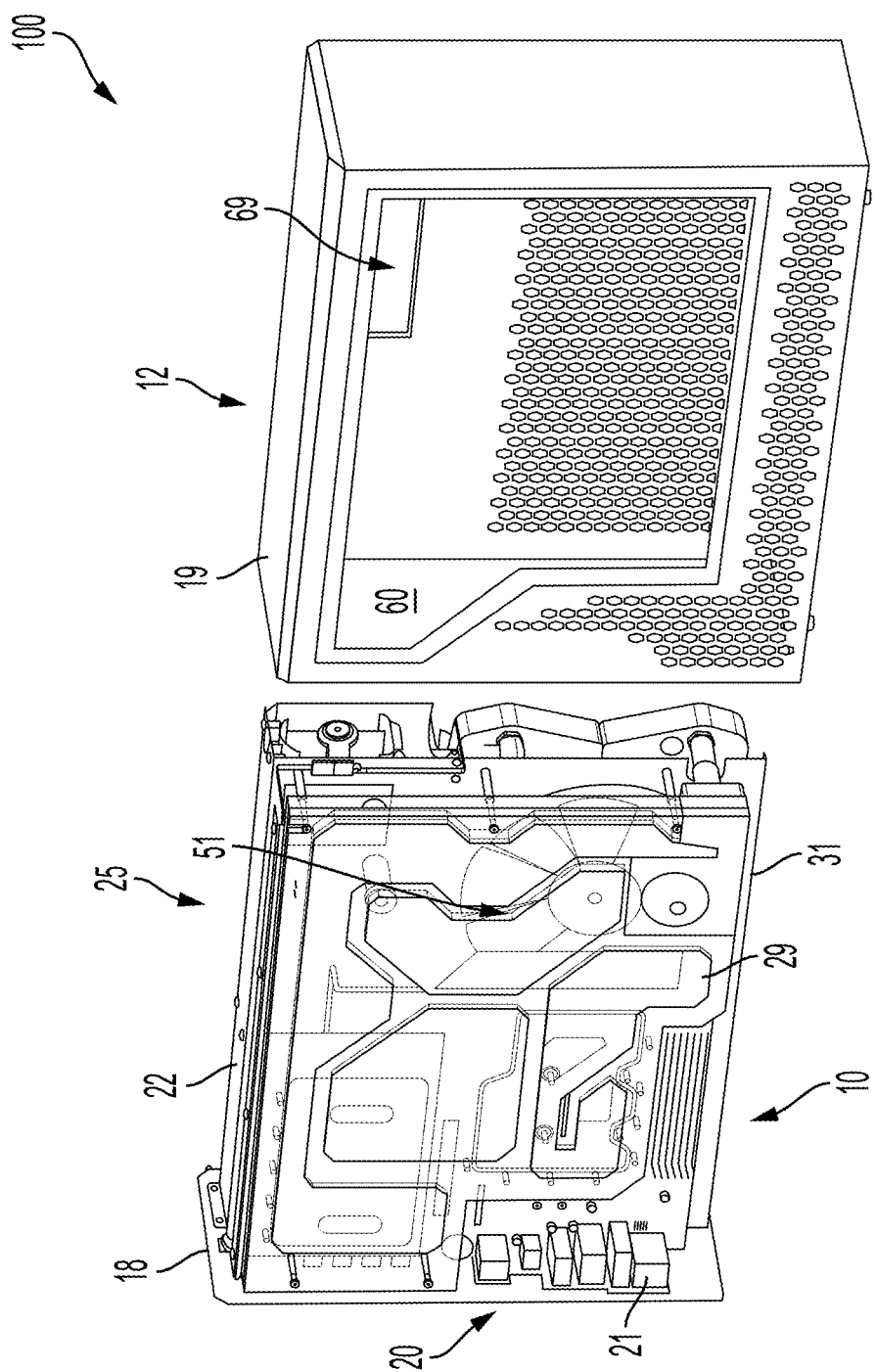
FIG. 28 is a front perspective view of the insert of FIG. 28 being inserted into the sleeve of FIG. 27, according to some embodiments of the present disclosure.
Figure 29:
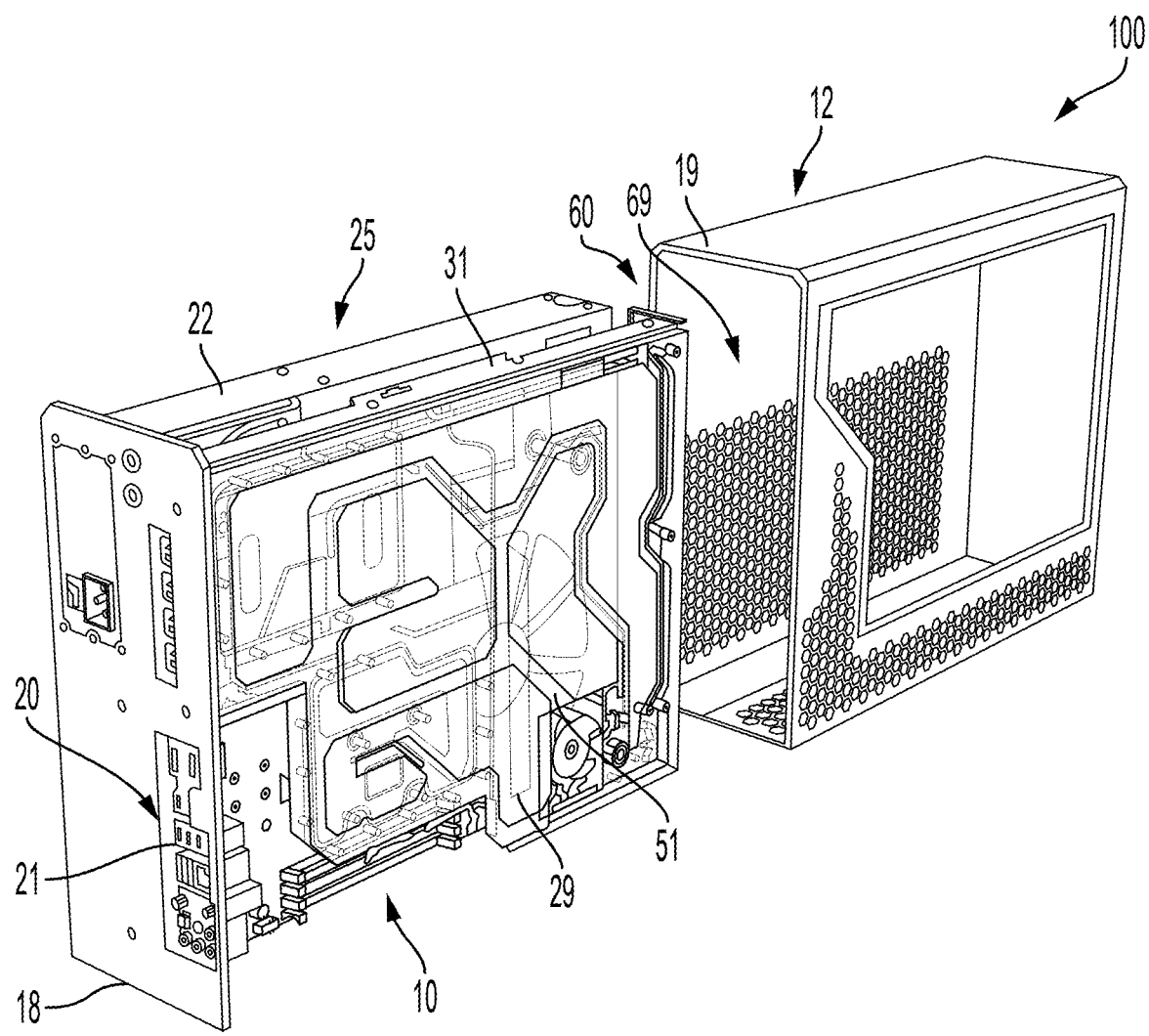
FIG. 29 is a rear perspective view of the insert of FIG. 28 being inserted into the sleeve of FIG. 27, according to some embodiments of the present disclosure.

Referring now to FIGS. 27-29, the device 100 is shown to depict the removal of the removable insert 25 from, or insertion of the same into, the sleeve 19, according to some embodiments of the present disclosure. As suggested above, the sleeve 19 may be arranged such that the opening 60 is left where the removable panel 18 would otherwise be. The dimensions of the removable insert 25 may be arranged such that the removable insert 25 is insertable within the sleeve 19. Generally, this advantageously provides access to the motherboard 10 in a manner that may not require significant steps or manual labor, such as disassembling a side panel, as may be the case in conventional computing devices. As shown with particular reference to FIG. 27, the insert 25 may be moved in a direction 58 (e.g., along the lateral axis 97 of the device 100) to be inserted into or removed from the sleeve 19. Accordingly, due at least in part to the stacked configuration of the first component 47 and the second component 45 of the insert 25, the insert 25 may be inserted into the sleeve 19, thereby forming a sleeved configuration for the chassis 12.

As discussed herein, the present disclosure further provides for a method of providing the device 100. For instance, such method may include providing the sleeve 19, providing the first component 47, and providing the second component 45. The first component 47 may include the motherboard 10, and the second component 45 may include the power supply 41. The method may further include securing the first component 47 to the first tray 29 and securing the second component 45 to the second tray 31. The method may further include fixing the first tray 29 and the second tray 31 to the removable panel 18. The method may further include detachably securing the removable panel 18 over the opening 60 formed by the sleeve 19, such that the first tray and 29 the second tray 31 are inserted within the interior 69 of the sleeve 19.

Thus, although there have been described particular embodiments of the present invention of a new and useful SLEEVED STACKED COMPUTER HARDWARE CHASSIS, it is not intended that such references to particular embodiments be construed as limitations upon the scope of this invention.

What is claimed is:

1. A computing device, comprising: a chassis including a sleeve, a removable panel detachably secured over an opening formed by the sleeve, a first tray secured to and laterally extending from the removable panel into an interior of the sleeve, and a second tray secured to and laterally extending from the removable panel into the interior of the sleeve; a first component disposed on the first tray, the first component including a motherboard; a second component disposed on the second tray, the second component including one or more fans, wherein the removable panel includes an interface securing one or more input/output connectors on the motherboard; and an insert including the removable panel, the first tray, and the second tray, wherein the sleeve includes a vertical panel oriented parallel to the removable panel when the insert is inserted into the sleeve and covers the opening, and wherein the sleeve further includes a top panel, a bottom panel oriented parallel to the top panel, a left panel, and a right panel oriented parallel to the left panel, each extending between the vertical panel and the removable panel.

2. The device of claim 1, wherein the first tray is oriented in parallel relative to the second tray.

3. The device of claim 2, wherein the first tray and the second tray are each vertically oriented.

4. The device of claim 3, wherein the first component further includes an add-on card positioned vertically above the motherboard.

5. The device of claim 4, wherein the first component and the second component are in electrical communication via a blind mate interface (BMI) connector.

6. The device of claim 4, wherein the second component includes a coolant supply, and
   wherein the coolant supply is configured to transmit coolant between the first component and the second component via a quick-disconnect fitting.

7. The device of claim 4, wherein the first tray is an acrylic mono-block.

8. A chassis for a computing device, the chassis comprising: a sleeve; a removable panel detachably secured over an opening formed by the sleeve; a first tray secured to and laterally extending from the removable panel into an interior of the sleeve; a second tray secured to and laterally extending from the removable panel into the interior of the sleeve, wherein the first tray is oriented in parallel relative to the second tray, wherein the first tray is configured to secure a first component of a computing device, the first component including a motherboard, wherein the second tray is configured to secure a second component of the computing device, the second component including one or more fans, and wherein the removable panel includes an interface securing one or more input/output connectors on the motherboard; and an insert including the removable panel, the first tray, and the second tray, wherein the sleeve includes a vertical panel oriented parallel to the removable panel when the insert is inserted into the sleeve and covers the opening, and wherein the sleeve further includes a top panel, a bottom panel oriented parallel to the top panel, a left panel, and a right panel oriented parallel to the left panel, each extending between the vertical panel and the removable panel.

9. The chassis of claim 8, wherein the first tray and the second tray are each vertically oriented.

10. The chassis of claim 9, wherein the first component further includes an add-on card configured to be positioned vertically above the motherboard.

11. The chassis of claim 9, further comprising a blind mate interface (BMI) connector extending between the first tray and the second tray, wherein the BMI connector is configured to provide electrical communication between the first component and the second component.

12. The chassis of claim 9, wherein the first tray is an acrylic mono-block.

13. A method of providing a computing device, the method comprising: providing a sleeve; providing a first component, the first component including a motherboard; providing a second component, the second component including one or more fans; securing the first component to a first tray; securing the second component to a second tray; fixing the first tray and the second tray to a removable panel; and inserting an insert into the sleeve and detachably securing the removable panel over an opening formed by the sleeve, such that each of the first tray and the second tray laterally extend from the removable panel and are inserted within an interior of the sleeve, wherein the removable panel includes an interface securing one or more input/output connectors on the motherboard, wherein the insert includes the removable panel, the first tray, and the second tray, wherein the sleeve includes a vertical panel oriented parallel to the removable panel when the insert is inserted into the sleeve and covers the opening, and wherein the sleeve further includes a top panel, a bottom panel oriented parallel to the top panel, a left panel, and a right panel oriented parallel to the left panel, each extending between the vertical panel and the removable panel.

14. The method of claim 13, further comprising orienting the first tray in parallel relative to the second tray.

15. The method of claim 13, wherein the first tray and the second tray are each vertically oriented.

16. The method of claim 15, further comprising providing a blind mate interface (BMI) connector between the first component and the second component, such that the first component and the second component are in electrical communication via the BMI connector.

17. The device of claim 4, wherein the second component further includes a coolant supply, and
   wherein the method further comprises providing a quick-disconnect fitting between the first component and the second component, such that the coolant supply is configured to transmit coolant between the first component and the second component via the quick-disconnect fitting.

\* \* \* \* \*